(12) United States Patent
Ichimiya

(10) Patent No.: US 8,804,027 B2
(45) Date of Patent: Aug. 12, 2014

(54) IMAGING APPARATUS

(75) Inventor: Takashi Ichimiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 334 days.

(21) Appl. No.: 12/563,828

(22) Filed: Sep. 21, 2009

(65) Prior Publication Data
US 2010/0073527 A1    Mar. 25, 2010

(30) Foreign Application Priority Data
Sep. 25, 2008   (JP) .................................. 2008-246590

(51) Int. Cl.
*G03B 13/00* (2006.01)
*H04N 5/232* (2006.01)

(52) U.S. Cl.
USPC ........................................................ 348/349

(58) Field of Classification Search
None
See application file for complete search history.

(56) References Cited

U.S. PATENT DOCUMENTS

| | | | |
|---|---|---|---|
| 5,886,353 A * | 3/1999 | Spivey et al. | 348/E5.086 |
| 5,955,753 A | 9/1999 | Takahashi | |
| 6,819,360 B1 | 11/2004 | Ide | |
| 6,829,008 B1 * | 12/2004 | Kondo et al. | 348/302 |
| 7,095,441 B2 * | 8/2006 | Nagano | 348/308 |
| 7,920,781 B2 * | 4/2011 | Onuki | 348/294 |
| 7,989,745 B2 * | 8/2011 | Suzuki | 348/294 |
| 2003/0011693 A1 * | 1/2003 | Oda | 348/272 |
| 2003/0214592 A1 * | 11/2003 | Ikeyama | 348/251 |
| 2008/0180554 A1 * | 7/2008 | Kobayashi et al. | 348/246 |
| 2009/0128671 A1 * | 5/2009 | Kusaka | 348/246 |

FOREIGN PATENT DOCUMENTS

| | | |
|---|---|---|
| JP | 09-046596 A | 2/1997 |
| JP | 2000-292686 A | 10/2000 |
| JP | 2001-036819 A | 2/2001 |
| JP | 2001-177756 A | 6/2001 |
| JP | 2001-177756 A | 6/2001 |
| JP | 2003-101872 A | 4/2003 |
| JP | 2004-191893 A | 7/2004 |

* cited by examiner

*Primary Examiner* — Sinh Tran
*Assistant Examiner* — Jason Flohre
(74) *Attorney, Agent, or Firm* — Canon U.S.A., Inc. IP Division

(57) ABSTRACT

An imaging apparatus includes an image sensor including a first pixel group used for generating an image signal by photoelectrically converting an object image and a second pixel group configured to receive a light flux that has passed through divided areas of the exit pupil, a memory unit configured to store information about whether a defective pixel exists in any pixel included in the second pixel group, a control unit configured to execute calculation including combination processing on output signals of the second pixel group existing in a predetermined area, and a controller configured to control a shooting operation according to a result of the calculation by the calculation unit. The calculation unit is configured, if a defective pixel whose information is stored on the memory unit exists in the combination processing, to execute the calculation by using the output signals of the second pixel group.

9 Claims, 29 Drawing Sheets

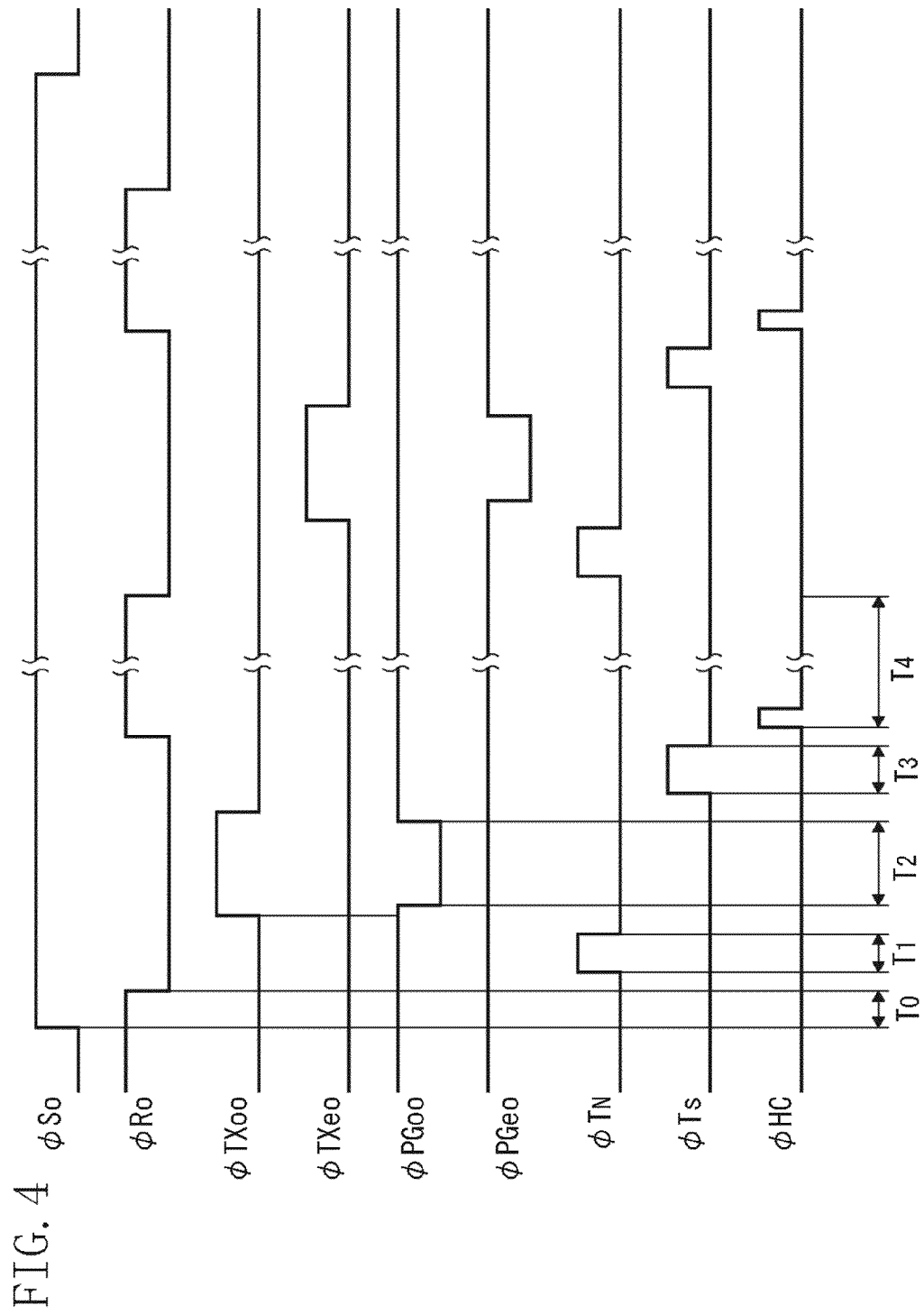

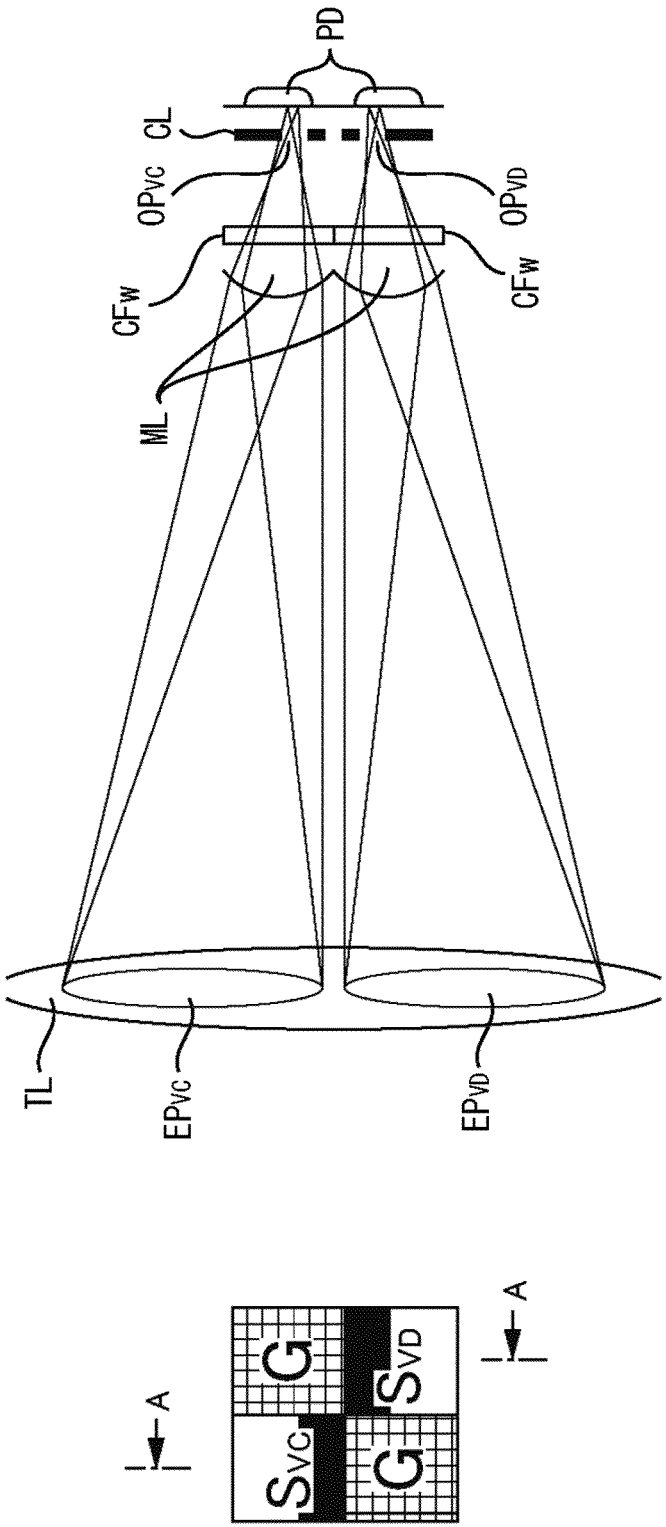

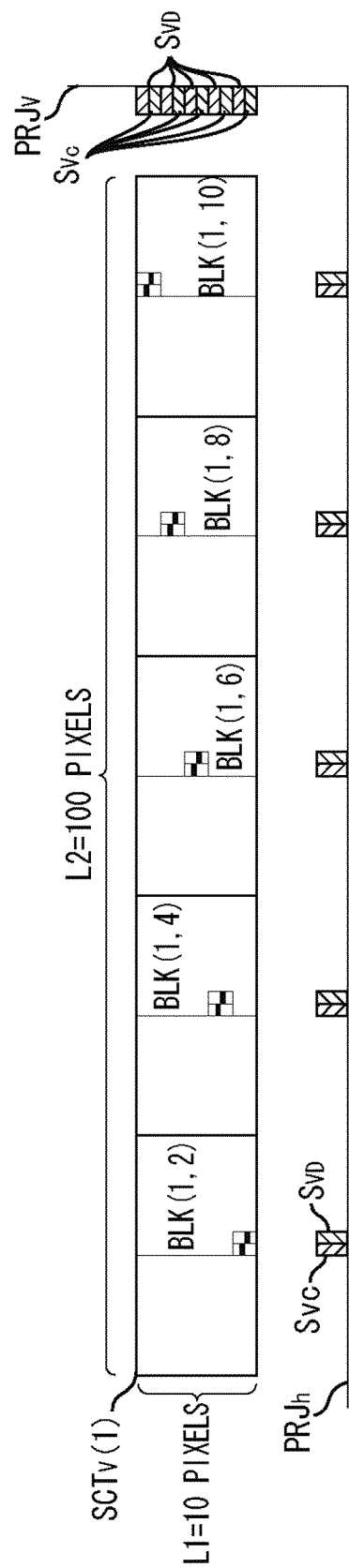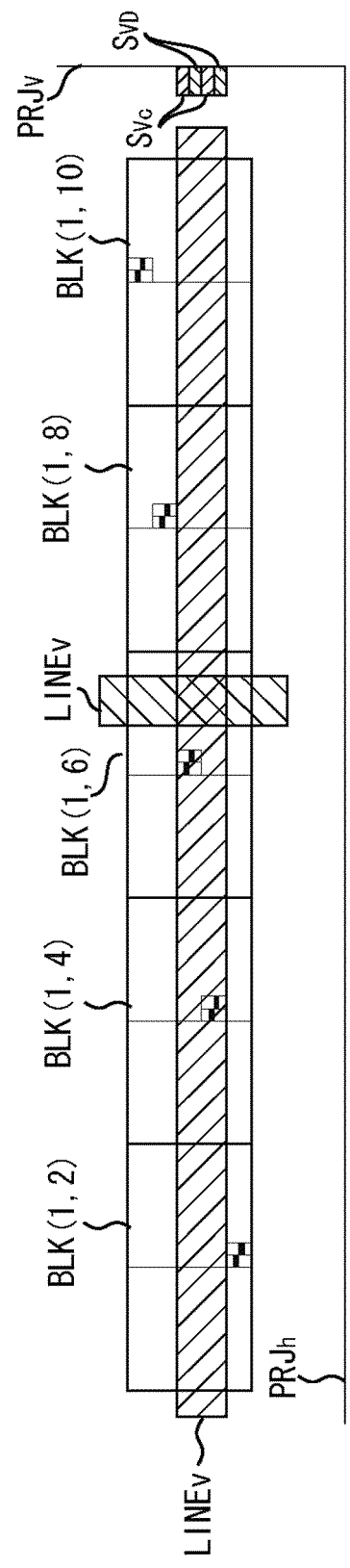

FIG. 24B
FIG. 24A
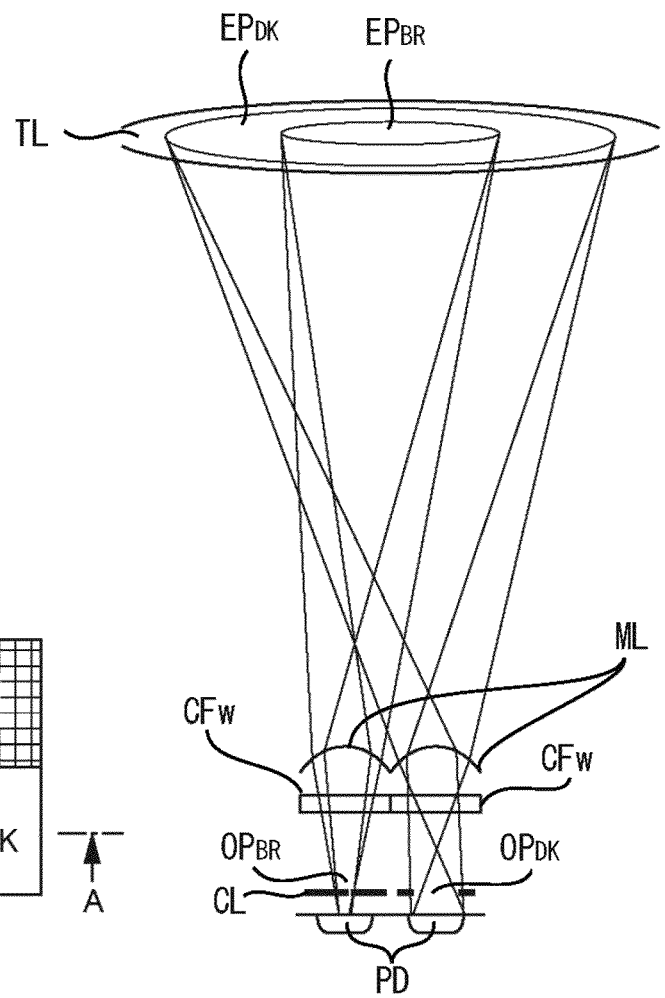
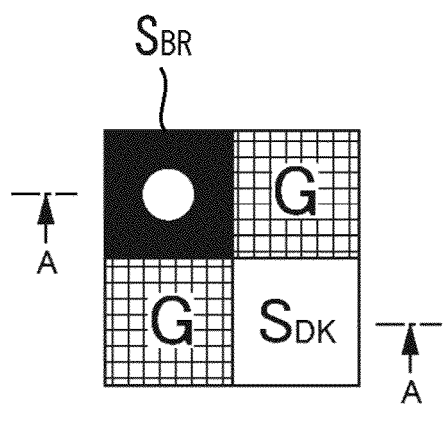

FIG. 29

| LUMINANCE RATIO | UNDER-EXPOSURE | | | | | | | APPROPRIATE EXPOSURE | OVER-EXPOSURE | | | | | | | |
|---|---|---|---|---|---|---|---|---|---|---|---|---|---|---|---|---|
| | -7 | -6 | -5 | -4 | -3 | -2 | -1 | 0 | +1 | +2 | +3 | +4 | +5 | +6 | +7 | +8 |
| HIGH-LUMINANCE AE PIXEL SIGNAL | | | | | | | | 1 | 2 | 4 | 8 | 16 | 32 | 64 | 128 | 256 |
| LOW-LUMINANCE AE PIXEL SIGNAL | 1 | 2 | 4 | 8 | 16 | 32 | 64 | 128 | 256 | | | | | | | | |

IMAGING APPARATUS

BACKGROUND OF THE INVENTION

1. Field of the Invention

The present invention relates to an imaging apparatus, such as a digital still camera and a video camera. In particular, the present invention relates to a lens barrel, which includes an opening/closing barrier member provided on a front surface of a photographic optical system to protect the photographic optical system, and an imaging apparatus.

2. Description of the Related Art

A conventional camera system having a solid-state image sensor, such as a digital still camera and a video camera, shoots a still image and a moving image by using one or more image sensors and records the taken image on a recording unit, such as a memory.

The above-described conventional camera system can use a part of an imaging area of the image sensor for a function other than an image shooting function.

Japanese Patent Application Laid-Open No. 2000-292686 discusses a method for executing a pupil division function by using a light receiving portion (a part of the image sensor) of pixels, which is divided into two. The method discussed in Japanese Patent Application Laid-Open No. 2000-292686 uses the pixel as a focus detection pixel and arranges the focus detection pixels between imaging pixels at a predetermined interval. Thus, the method implements phase difference focus detection.

On the other hand, a defect may occur on a pixel constituting an image sensor during manufacture of the image sensor. The defect includes a white flaw, which may cause the level of an output signal of the defective pixel to increase, a black spot pixel, which may cause the level of an output signal of the defective pixel to decrease, and poor linearity of an output signal.

If a pixel set in a focus detection area has the above-described defect, an error may occur in a result of focus detection.

In order to address the above-described problem, Japanese Patent Application Laid-Open No. 2001-177756 discusses a method for reducing an effect from the defective pixel by moving the entire focus detection area if a pixel set in a focus detection area includes a defect.

However, in a camera discussed in Japanese Patent Application Laid-Open No. 2000-292686, if a pixel set in the focus detection area includes a defect, it is necessary to discard the defective image sensor in order to prevent an error that may occur in the result of focus detection.

An image sensor is a relatively expensive component among those of a camera system. Accordingly, if a pixel set in the focus detection area includes a defect and if the image sensor including the defective pixel is discarded, the cost of manufacture of the imaging apparatus and the camera system may increase.

In addition, a camera discussed in Japanese Patent Application Laid-Open No. 2001-177756 moves the focus detection area to an area including no defective pixel. Accordingly, the camera discussed there may focus on an object different from an object of an image that a user of the camera desires to capture.

SUMMARY OF THE INVENTION

The present invention is directed to a method for preventing degradation of the function of the defective pixel, if a pixel constituting a part of an imaging area of an image sensor is used for a function other than an image taking function and if the pixel includes a defect.

According to the present invention, an imaging apparatus configured to capture an image of an object includes an image sensor including a first pixel group used for generating an image signal by photoelectrically converting an object image that has passed through an exit pupil of a photographic optical system and a second pixel group configured to receive a light flux that has passed through divided areas of the exit pupil of the photographic optical system which are discretely arranged, a memory unit configured to store information about whether a defective pixel exists in any pixel included in the second pixel group, a control unit configured to execute calculation including combination processing on output signals of the second pixel group existing in a predetermined area within the second pixel group, and a controller configured to control a shooting operation executed by the imaging apparatus according to a result of the calculation by the calculation unit. In the imaging apparatus, the calculation unit is configured, if a defective pixel whose information is stored on the memory unit exists in the combination processing, to execute the calculation by using the output signals of the second pixel group.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of an image sensor driving timing chart.

FIGS. 7A and 7B are a plan view and a cross section of another AF pixel of the image sensor according to the first exemplary embodiment of the present invention.

FIGS. 14A and 14B illustrate an example of an image sampling characteristic acquired during vertical defocus detection according to the first exemplary embodiment of the present invention.

FIGS. 24A and 24B are a plan view and a cross section of an auto exposure (AE) pixel of an image sensor according to a fourth exemplary embodiment of the present invention.

FIG. 29 illustrates an example of a correspondence table of an AE pixel signal and a luminance ratio according to the fourth exemplary embodiment of the present invention.

DESCRIPTION OF THE EMBODIMENTS

Various exemplary embodiments, features, and aspects of the invention will be described in detail below with reference to the drawings.

Figure 1:
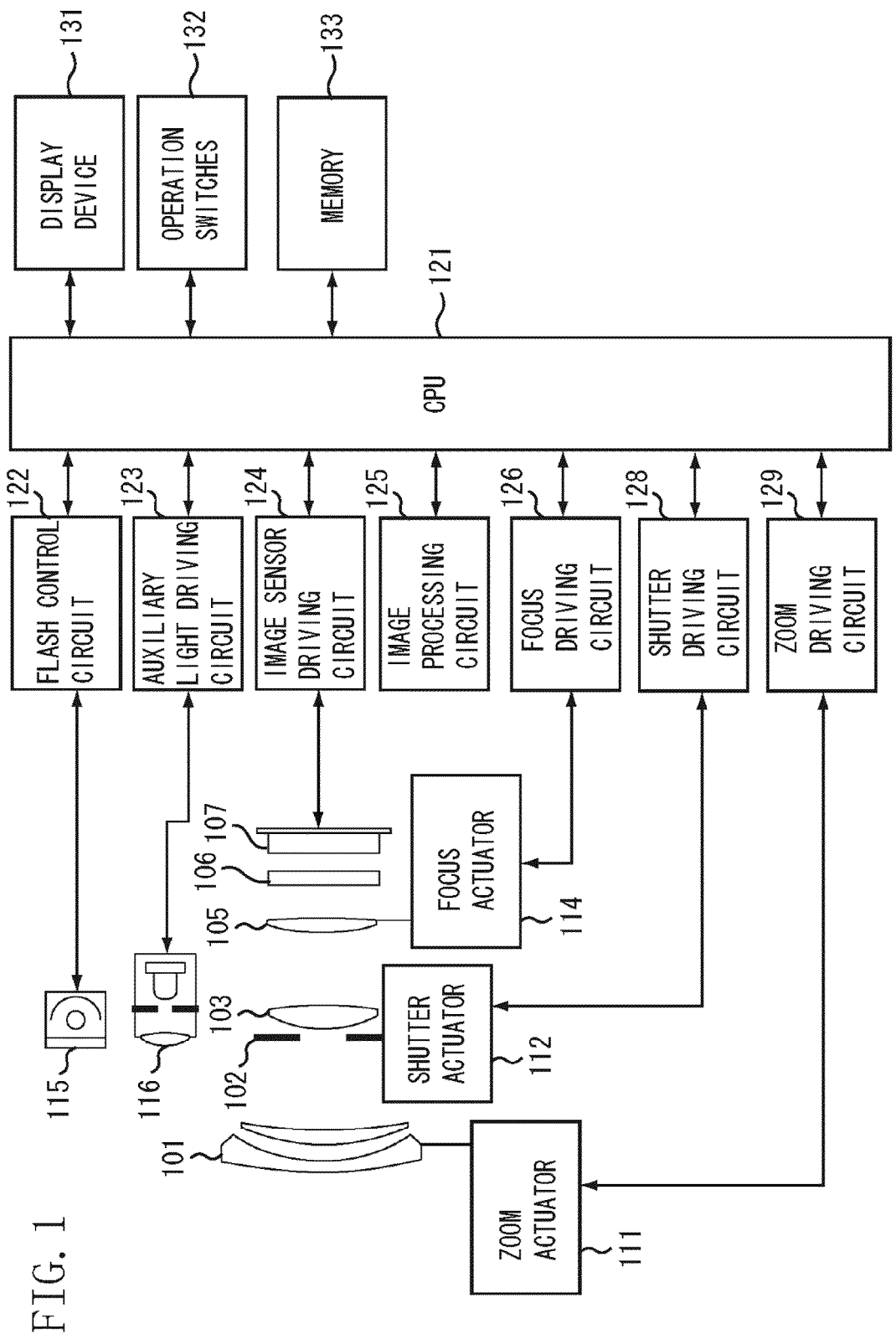
FIG. 1 illustrates an exemplary configuration of a digital camera according to a first exemplary embodiment of the present invention.

FIG. 1 illustrates an exemplary configuration of a camera according to each exemplary embodiment of the present invention. The camera illustrated in FIG. 1 is a digital camera including a camera body having an image sensor and a photographic optical system integrally provided on the camera.

Referring to FIG. 1, a first lens unit 101 is disposed at a location closest to an object side of the photographic optical system (a shooting lens). The first lens unit 101 can protrude and retract in the direction of an optical axis.

A shutter 102 includes a function as an aperture stop. The shutter 102 adjusts the amount of light during shooting by adjusting an aperture ratio thereof. In addition, the shutter 102 adjusts exposure time in capturing a still image.

A second lens unit 103 and the shutter 102 integrally protrude and retract in the direction of the optical axis to implement magnification (zooming) by operating in cooperation of the protrusion and retraction of the first lens unit 101.

A third lens unit 105 protrudes and retracts in the direction of the optical axis to execute focusing. An optical low-pass filter 106 includes a function for reducing fake color and moire occurring on a photographed image.

An image sensor 107 includes a complementary metal oxide semiconductor (CMOS) sensor and peripheral circuits. The image sensor 107 is a two-dimensional single-plate color sensor, in which a primary-colors mosaic filter having a Bayer array is formed on light-receiving pixels of m (horizontal direction)×n (vertical direction) pixels.

A zoom actuator 111 rotates a cam barrel (not illustrated) to drive the first lens unit 101 and the second lens unit 103 to protrude and retract in the direction of the optical axis and to execute a magnification operation.

A shutter actuator 112 controls the aperture ratio (diameter) of the shutter 102 to adjust the amount of light for shooting and also controls the exposure time during shooting of a still image.

A focus actuator 114 executes focusing by causing the third lens unit 105 to protrude and retract in the direction of the optical axis. An electronic flash 115 illuminates an object during shooting. As the electronic flash 115, a flash illumination device using a xenon tube is generally used. However, an illumination device using a light-emitting diode (LED) capable of continuously emitting light can also be used.

An AF auxiliary light projection device 116 projects a mask image having a predetermined opening pattern in a shooting field via a projection lens to increase a focus detection capacity in capturing an image of a dark object or a low-contrast object.

A CPU 121 executes control of various units and circuits of the camera. The CPU 121 includes units and circuits, such as a calculation unit, a read-only memory (ROM), a random access memory (RAM), an analog-to-digital (A/D) converter, a digital-to-analog (D/A) converter, and a communication interface circuit. The CPU 121 drives various circuits of the camera according to a program previously stored on the ROM. In addition, the CPU 121 executes a series of processing, such as AF, AE, shooting, image processing, and recording.

A flash control circuit 122 controls turning on and off of the electronic flash 115 in synchronization with the shooting operation. An auxiliary light drive circuit 123 controls turning on and off of the AF auxiliary light projection device 116 in synchronization with the focus detection operation.

An image sensor drive circuit 124 drives the image sensor 107. Furthermore, the image sensor drive circuit 124 executes A/D conversion on an acquired image signal and transmits the converted image signal to the CPU 121.

An image processing circuit 125 executes processing, such as gamma-conversion, color interpolation, and Joint Photographic Experts Group (JPEG)-compression, on an image signal acquired by the image sensor 107.

A focus drive circuit 126 drives and controls the focus actuator 114 according to a result of the focus detection. The focus drive circuit 126 drives the third lens unit 105 to cause the same to protrude and retract in the direction of the optical axis to execute focusing.

A shutter drive circuit 128 drives the shutter actuator 112 to control the opening and closing of the shutter 102. A zoom drive circuit 129 drives the zoom actuator 111 according to a zooming operation executed by a photographer.

A display unit 131, such as an liquid crystal display (LCD), displays information about a shooting mode of the camera, a preview image, which is displayed before finally shooting a shooting target object, and a verification image acquired after shooting the object, and displays an in-focus state display image displayed during the focus detection.

Operation switches 132 include a camera power switch, a release (shooting trigger) switch, a zooming operation switch, and a shooting mode designation switch. A memory 133 is a removable flash memory. The memory 133 records a taken image.

Figure 2:
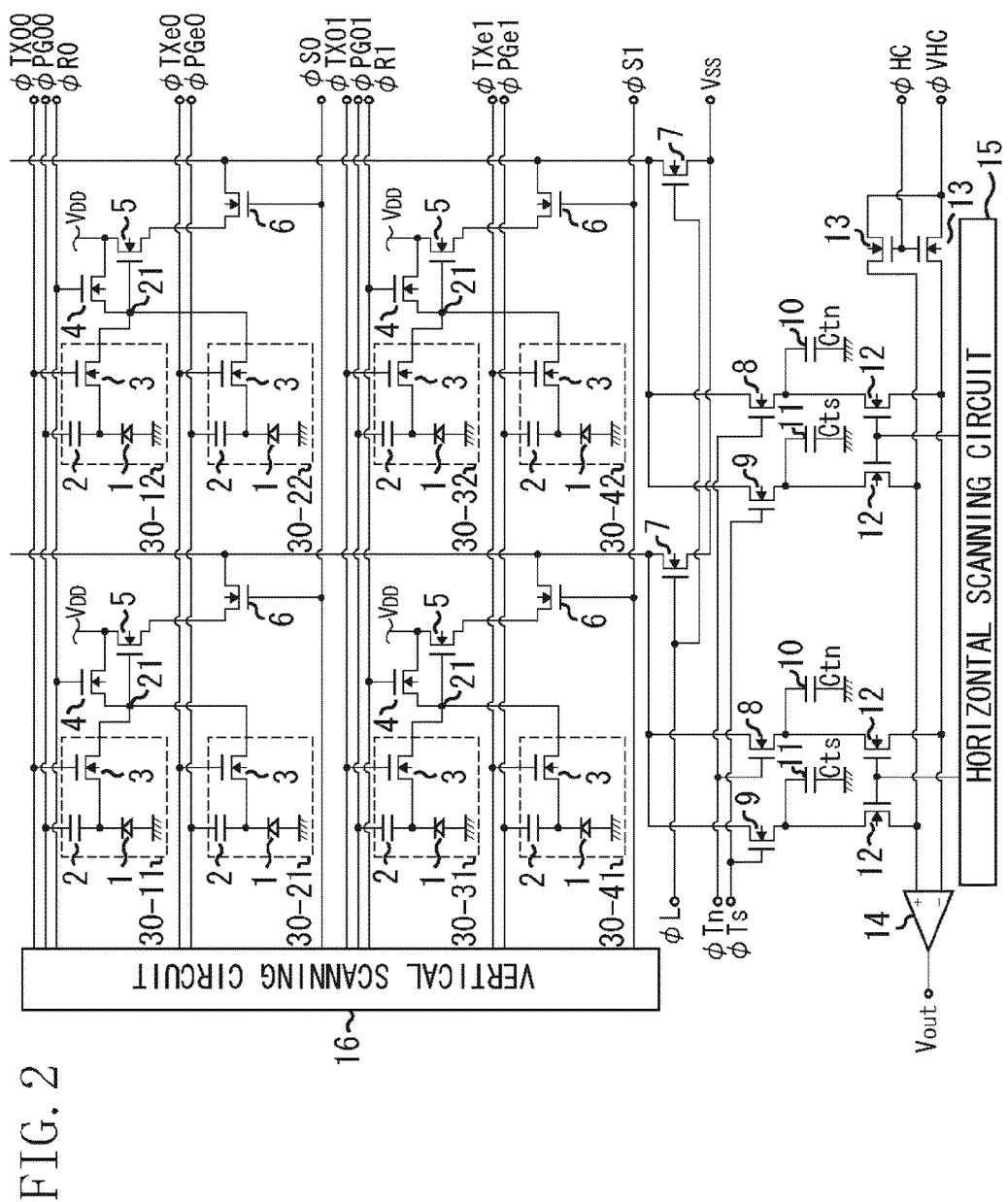
FIG. 2 illustrates an example of a circuit diagram of an image sensor.

FIG. 2 illustrates an example of circuits of the image sensor 107. The image sensor 107 is manufactured by using a method discussed in Japanese Patent Application Laid-Open No. 09-046596.

In the example illustrated in FIG. 2, an area of 2×4 pixels of a two-dimensional CMOS area sensor is illustrated. When the image sensor 107 is actually manufactured and used, the image sensor 107 includes a multiple of the pixels illustrated in FIG. 2, which is thus capable of acquiring a high-resolution image.

In the present exemplary embodiment, it is supposed that the image sensor 107 has a pixel pitch of 2 μm, a number of effective pixels is 6,000,000 pixels (3,000 (horizontal)×2,000 (vertical) pixels), in a 6 mm (lateral)×4 mm (longitudinal)-sized image capturing plane.

Referring to FIG. 2, the image sensor 107 includes various components and circuits such as a photoelectric conversion unit 1 of a photoelectric conversion device, which includes a transistor gate and a depletion layer provided below the gate, a photo gate 2, a transfer switch metal oxide semiconductor (MOS) transistor 3, a resetting MOS transistor 4, a source follower amplifier MOS transistor 5, a horizontal selection switch MOS transistor 6, a source follower load MOS transistor 7, a dark output transfer MOS transistor 8, a light output transfer MOS transistor 9, a dark output accumulation capacity Ctn 10, a light output accumulation capacity Cts 11, a horizontal transfer MOS transistor 12, a horizontal output line resetting MOS transistor 13, a differential output amplifier 14, a horizontal scanning circuit 15, and a vertical scanning circuit 16.

Figure 3:
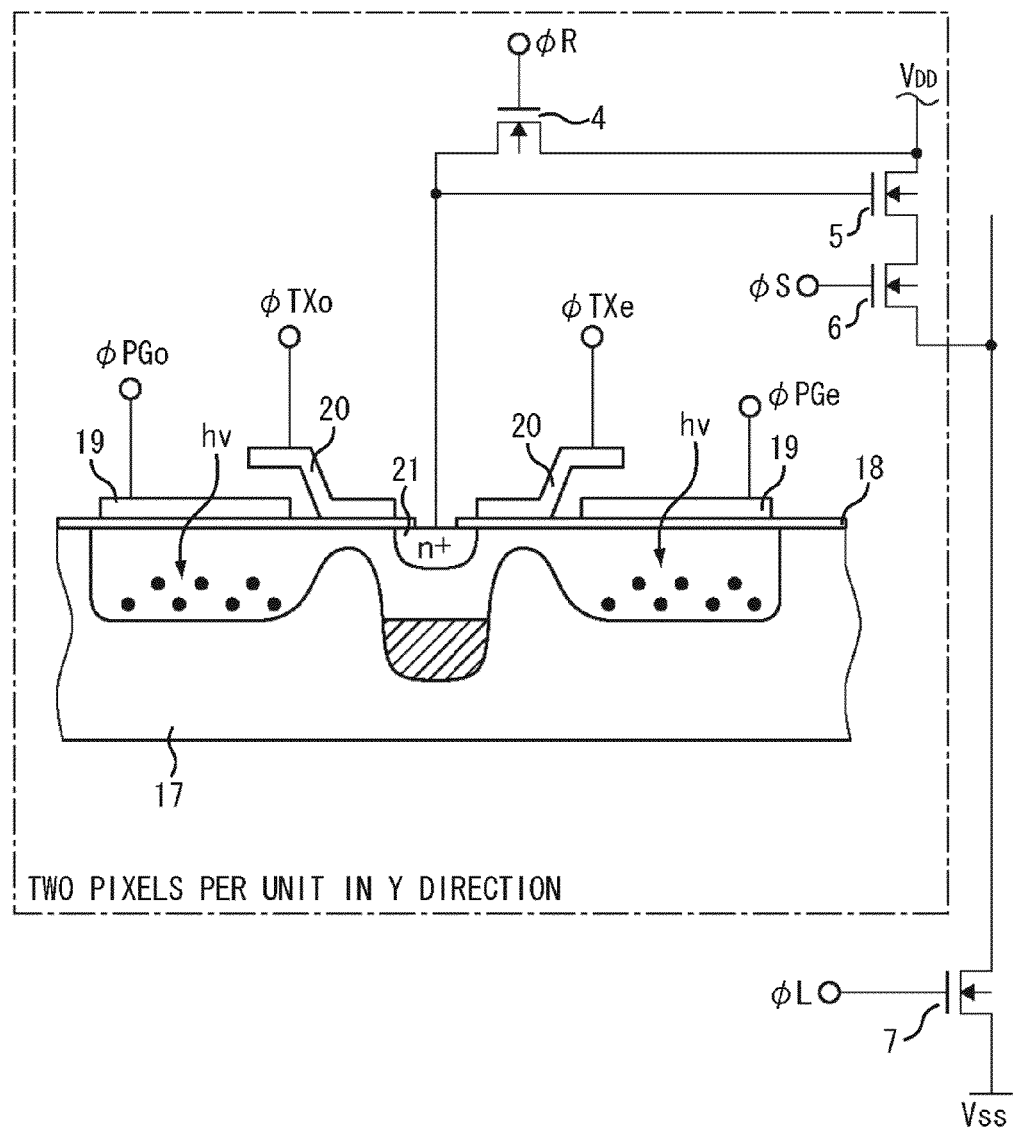
FIG. 3 is a cross section of a pixel portion of the image sensor.

FIG. 3 is a cross section of each pixel portion. Referring to FIG. 3, a pixel portion includes a P-type well 17, a gate oxide 18, a first layer poly-Si 19, a second layer poly-Si 20, and an n+ floating diffusion (FD) portion 21.

The FD portion 21 is connected with another photoelectric conversion unit via another transfer MOS transistor. In the example illustrated in FIG. 3, a drain and the FD portion 21 are provided for shared use by two transfer MOS transistors 3. Thus, the present exemplary embodiment reduces the dimension of each pixel and increases the sensitivity by reducing the volume of the FD portion 21 as described above. However, the present exemplary embodiment is not limited to this. More specifically, the FD portion 21 can be connected by aluminum wiring.

Now, an operation of the image sensor 107 will be described in detail below with reference to a timing chart illustrated in FIG. 4. The timing chart illustrated in FIG. 4 illustrates timing when all pixels are output independently from one another.

Referring to FIG. 4, before timing T0, the level of a control pulse φTL is set high and a vertical output line is reset according to a timing output from the vertical scanning circuit 16. In addition, the level of each of control pulses φR0, φPG00, and φPGe0 is set high. Furthermore, the resetting MOS transistor 4 is powered ON. Moreover, the level of the first layer poly-Si 19 of the photo gate 2 is set high.

At timing T0, the level of a control pulse φS0 is set high. In addition, the horizontal selection switch MOS transistor 6 is powered ON. Furthermore, pixel portions on first and second lines are designated. Next, the level of a control pulse φR0 is set low. The resetting of the FD portion 21 is discontinued to set the FD portion 21 in a floating state.

After setting a gate-source voltage of the source follower amplifier MOS transistor 5 as a through voltage, at timing T1, the level of a control pulse φTn is set high. In addition, a dark voltage of the FD portion 21 is output to dark output accumulation capacity Ctn 10 by using the source follower amplifier MOS transistor 5.

Furthermore, a control pulse φTX00 of the first line is set high to execute photoelectric conversion of the pixels on the first line and output the result. Moreover, the transfer switch MOS transistor 3 is brought to conduction. Then, at timing T2, the level of a control pulse φPG00 is reduced to be low. As a relationship between the voltage levels, it is useful if a potential well, which has extended below the photo gate 2, is ascended to completely transfer light-generating carriers to the FD portion 21. If the complete transfer is available, it is also useful that a fixed potential is used instead of a control pulse φTX.

When a charge from the photo diode photoelectric conversion unit 1 is transferred to the FD portion 21 at timing T2, the potential of the FD portion 21 may vary according to the mount of light. At this timing, the source follower amplifier MOS transistor 5 is in the floating state. Accordingly, at timing T3, the potential of the FD portion 21 is raised by setting a control pulse φTs high and is output to the light output accumulation capacity Cts 11.

At this timing, a dark output and a light output on the first line have been accumulated on the dark output accumulation capacity Ctn 10 and the light output accumulation capacity Cts 11, respectively. At timing T4, a control pulse φHC is temporarily set high. In addition, the horizontal output line resetting MOS transistor 13 is brought to conduction to reset a horizontal output line. Furthermore, the dark output and a light output are output on the horizontal output line according to a scanning timing signal from the horizontal scanning circuit 15 during a horizontal transfer time period.

At this timing, a signal having a high S/N ratio, from which pixel random noises and fixed pattern noises have been removed, can be acquired according to a differential output Vout acquired by the differential output amplifier 14 of the dark output accumulation capacity Ctn 10 and the light output accumulation capacity Cts 11.

Moreover, photoelectric charges of pixels 30-12 (FIG. 2) and 30-22 (FIG. 2) are accumulated on the dark output accumulation capacity Ctn 10 and the light output accumulation capacity Cts 11, respectively, at the same time as accumulating pixels 30-11 (FIG. 2) and 30-21 (FIG. 2) thereon. The accumulated charges are read on the horizontal output line by delaying a timing pulse from the horizontal scanning circuit 15 by timing equivalent to timing of one pixel. The read charges are output from the differential output amplifier 14.

In the present exemplary embodiment, the differential output Vout is generated within the chip. However, the present exemplary embodiment is not limited to this. More specifically, the effect of the present exemplary embodiment can be achieved if a conventional external correlated double sampling (CDS) circuit is used instead of including the differential output Vout within the chip.

After having output the light output to the light output accumulation capacity Cts 11, the level of a control pulse φR0 is set high. Furthermore, the resetting MOS transistor 4 is brought to conduction to reset the FD portion 21 on a power source VDD. After the horizontal transfer of the pixels on the first line is completed, the reading of the pixels on the second line starts.

The reading of the pixels on the second line is executed in the following manner. More specifically, control pulses φTXe0 and φPGe0 are driven as described above. Control pulses φTn and φTs are supplied with a high pulse. A photoelectric charge is accumulated on each of the dark output accumulation capacity Ctn 10 and the light output accumulation capacity Cts 11. A dark output and a light output are acquired.

The pixels on the first and the second lines are read independently by executing the driving described above.

Then, the vertical scanning circuit 16 starts scanning to read pixels on a (2n+1)-th line (n is an integer of 1 or greater), a (2n+2)-th line, and beyond. Thus, the present exemplary embodiment can independently output all the pixels.

More specifically, if n=1, then the level of a control pulse φS1 is set high. Subsequently, the level of a control pulse φR1 is set law and the level of each of control pulses φTn and φTX01 is set high. In addition, the levels of control pulses φPG01 and φTs are set low and high, respectively. Furthermore, the level of a control pulse φHC is temporarily set high. Moreover, the pixel signals of the pixels 30-31 (FIG. 2) and 30-32 (FIG. 2) are read.

Subsequently, control pulses φTXe1 and φPGe1 are applied in the above-described manner to read pixel signals of pixels 30-41 (FIG. 2) and 30-42 (FIG. 2).

FIGS. 5A through 7B illustrate an exemplary structure of an imaging pixel and a focus detection pixel.

The present exemplary embodiment employs a Bayer array. The Bayer array includes four (2×2) pixels. More specifically, the Bayer array includes two diagonally located pixels each having a spectral sensitivity of green (G), a pixel having a spectral sensitivity of red (R), and a pixel having a spectral sensitivity of blue (B). Focus detection pixels (functional pixels), which have a structure to be described below, are arranged between Bayer arrays having the above-described configuration according to a predetermined regulation in a scattered manner.

Figure 5B:
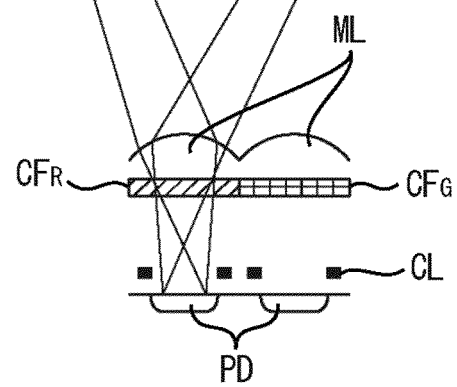
FIGS. 5A and 5B are a plan view and a cross section of an imaging pixel of the image sensor according to the first exemplary embodiment of the present invention.
Figure 5A:

FIGS. 5A and 5B illustrate an example of an arrangement and a structure of an imaging pixel, respectively. More specifically, FIG. 5A is a plan view illustrating an example of a 2×2 imaging pixel. In the example illustrated in FIG. 5A, the Bayer arrangement includes two G pixels, which are diagonally arranged, an R pixel, and a B pixel. A plurality of pixel blocks each including 2×2 (four) pixels having the above-described configuration is arranged one after another on the surface of the image sensor 107.

FIG. 5B illustrates a section A-A of the pixel block illustrated in FIG. 5A. Referring to FIG. 5B, an on-chip micro lens ML is provided on a top surface of each pixel. A color filter CFR is a color filter for the red (R) pixel. A color filter CFG is a color filter for the green (G) pixel. A photo diode (PD) corresponds to the photoelectric conversion unit of the CMOS sensor described above with reference to FIG. 3. A contact layer (CL) is a wiring layer on which a signal line for transmitting various signals within the CMOS sensor is provided. "TL" schematically denotes the photographic optical system.

In the example illustrated in FIG. 5B, the on-chip micro lens ML and the photoelectric conversion unit PD of the imaging pixel each function to capture a flux of light that has been incident on and passed through the photographic optical system (image taking lens) TL as effectively as possible.

In other words, an exit pupil EP of the photographic optical system TL and the photoelectric conversion unit PD are in a conjugate relationship across the micro lens ML. The effective area of the photoelectric conversion unit is large.

Furthermore, in the example illustrated in FIG. 5B, only a light flux incident on the R pixel is described. However, the G pixels and the B pixel have the same configuration as that of the R pixel and the light flux is incident on the G and B pixels in a similar manner as in the case of the R pixel.

Accordingly, the diameter of the exit pupil EP, which corresponds to each of the R, G, and B imaging pixels is large in the present exemplary embodiment. As described above, the present exemplary embodiment can effectively capture a light flux (a light quantum) from the object. Accordingly, the present exemplary embodiment can improve the S/N ratio of the image signal.

Figure 6B:
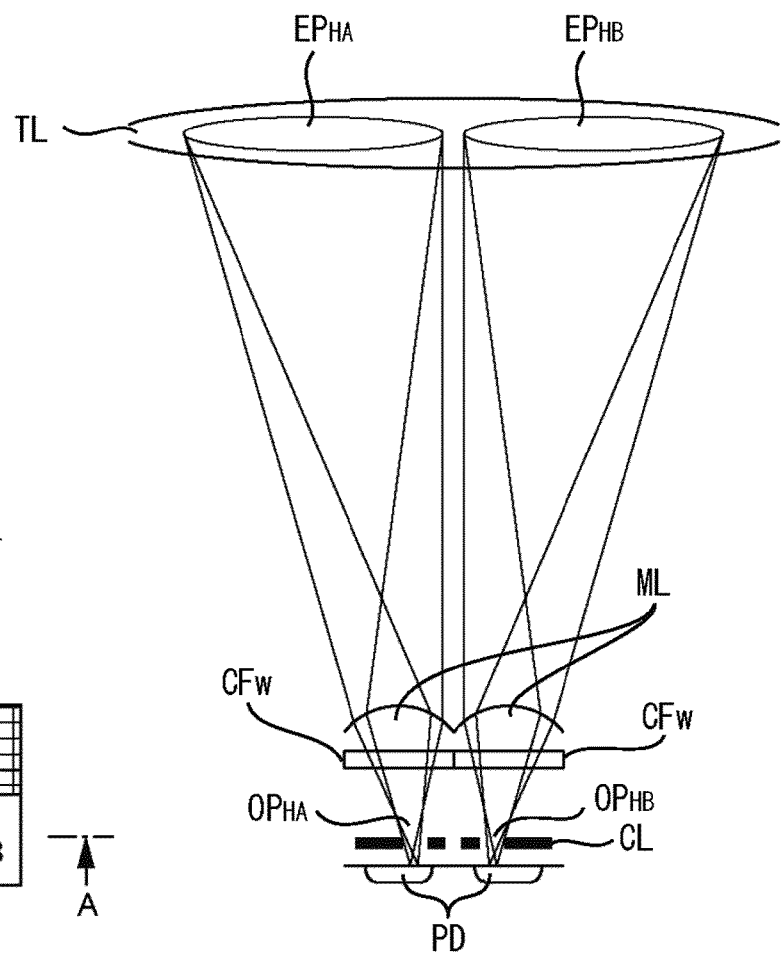
FIGS. 6A and 6B are a plan view and a cross section of an auto focus (AF) pixel of the image sensor according to the first exemplary embodiment of the present invention.
Figure 6A:
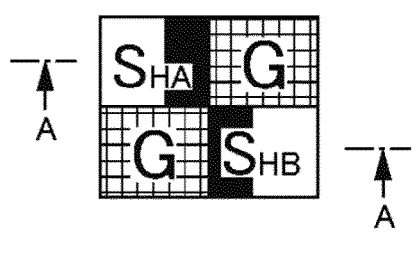

FIGS. 6A and 6B are diagrams respectively illustrating an arrangement and a structure of a focus detection pixel for executing pupil division in the horizontal direction of the photographic optical system. In the present exemplary embodiment, the "horizontal direction" or a "lateral direction" refers to a direction perpendicular to an optical axis when the photographer holds the camera so that the optical axis of the photographic optical system is positioned along a straight line in the horizontal direction.

FIG. 6A is a plan view illustrating four (2 (lateral)×2 (longitudinal)) pixels including a focus detection pixel.

In acquiring an image signal of an image to be recorded or viewed, a main component of luminance information of a G pixel is acquired. The image recognition characteristic of a person is sensitive to luminance information. Accordingly, if a G pixel is lost or defective, the person may easily recognize that the quality of the image is low.

Meanwhile, an R pixel or a B pixel is a pixel for receiving chrominance information (color difference information). Because the visual characteristic of a person is not sensitive to chrominance information, even if some of pixels for receiving chrominance information are defective, the person may not easily recognize that the quality of the image is degraded.

Accordingly, the present exemplary embodiment uses a G pixel of a pixel group including 2×2 (four) pixels as an imaging pixel (i.e., the present exemplary embodiment does not substitute a G pixel with a focus detection pixel) while substituting the R and B pixels with focus detection pixels (focus detection pixels SHA and SHB illustrated in FIG. 6A).

FIG. 6B illustrates a section A-A of the pixels illustrated in FIG. 6A. In the example illustrated in FIG. 6B, each of a micro lens ML and a photoelectric conversion unit PD has the same configuration as that of the imaging pixel illustrated in FIG. 5B.

The present exemplary embodiment does not use a signal of a focus detection pixel in generating an image. Accordingly, a transparent (clear) filter CFW (white) is provided instead of a color separation color filter. In addition, because the image sensor 107 executes pupil division, an opening portion of a wiring layer CL is biased towards a center line of a micro lens ML in a specific direction.

More specifically, because an opening OPHA of the pixel SHA is biased rightward, the image sensor 107 receives a light flux that has passed through an exit pupil EPHA, which is provided in a left portion of the photographic optical system TL. Similarly, because an opening OPHB of the pixel SHB is biased leftward, the image sensor 107 receives a light flux that has passed through an exit pupil EPHB, which is provided in a right portion of the photographic optical system TL.

Accordingly, a defocus amount of an object image can be detected according to a result of detection of a positional relationship between an image A of an object image acquired by using the pixels SHA, in which pixels SHA are regularly arranged in the horizontal direction, and an image B of an object image acquired by using the pixels SHB, in which pixels SHB are regularly arranged in the horizontal direction.

The focus detection can be executed on an object, such as a vertical straight line, whose luminance is distributed in the lateral direction of a shooting screen, by using the pixels SHA and SHB. However, the focus detection cannot be executed on an object such as a lateral line, whose luminance is distributed in the vertical direction of the shooting screen by using the pixels SHA and SHB.

Accordingly, in the present exemplary embodiment, pixels to be subjected to pupil division are provided also in the direction perpendicular (vertical) to the photographic optical system so that the focus detection can be executed on the latter type object.

FIGS. 7A and 7B respectively illustrate an exemplary arrangement and configuration of a focus detection pixel used for pupil division in the perpendicular direction (vertical direction) of the photographic optical system.

In the present exemplary embodiment, the "perpendicular direction" or the "vertical direction" refers to a direction perpendicular to an optical axis when the photographer holds the camera so that the optical axis of the photographic optical system is horizontally positioned and along a straight line in the normal direction.

FIG. 7A is a plan view of a 2×2 pixel including a focus detection pixel. Similar to the example illustrated in FIG. 6A, G pixels are left unsubstituted as imaging pixels while the R and B pixels are used as focus detection pixels SVC and SVD (FIG. 7A).

FIG. 7B illustrates a section A-A of the Bayer array illustrated in FIG. 7A. As described above, in the example illustrated in FIG. 6B, the pixel is pupil-divided in the lateral direction. In the example illustrated in FIG. 7B, which has the same configuration as that illustrated in FIG. 6B, the pixels are pupil-divided in the vertical direction.

More specifically, because an opening OPVC of the pixel SVC is biased downward, the image sensor 107 receives a light flux that has passed through an exit pupil EPVC, which is provided in the upper portion of the photographic optical system TL. In addition, because an opening OPVD of the pixel SVD is biased upward, the image sensor 107 receives a light flux that has passed through an exit pupil EPVD, which is provided in the lower portion of the photographic optical system TL.

Accordingly, a defocus amount of an object image whose luminance is vertically distributed can be detected according to a result of detection of a positional relationship between an image C of an object image acquired by using the pixels SVC, in which pixels SVC are regularly arranged in the vertical direction, and an image D of an object image acquired by using the pixels SVD, in which pixels SVD are regularly arranged in the vertical direction.

Figure 8:
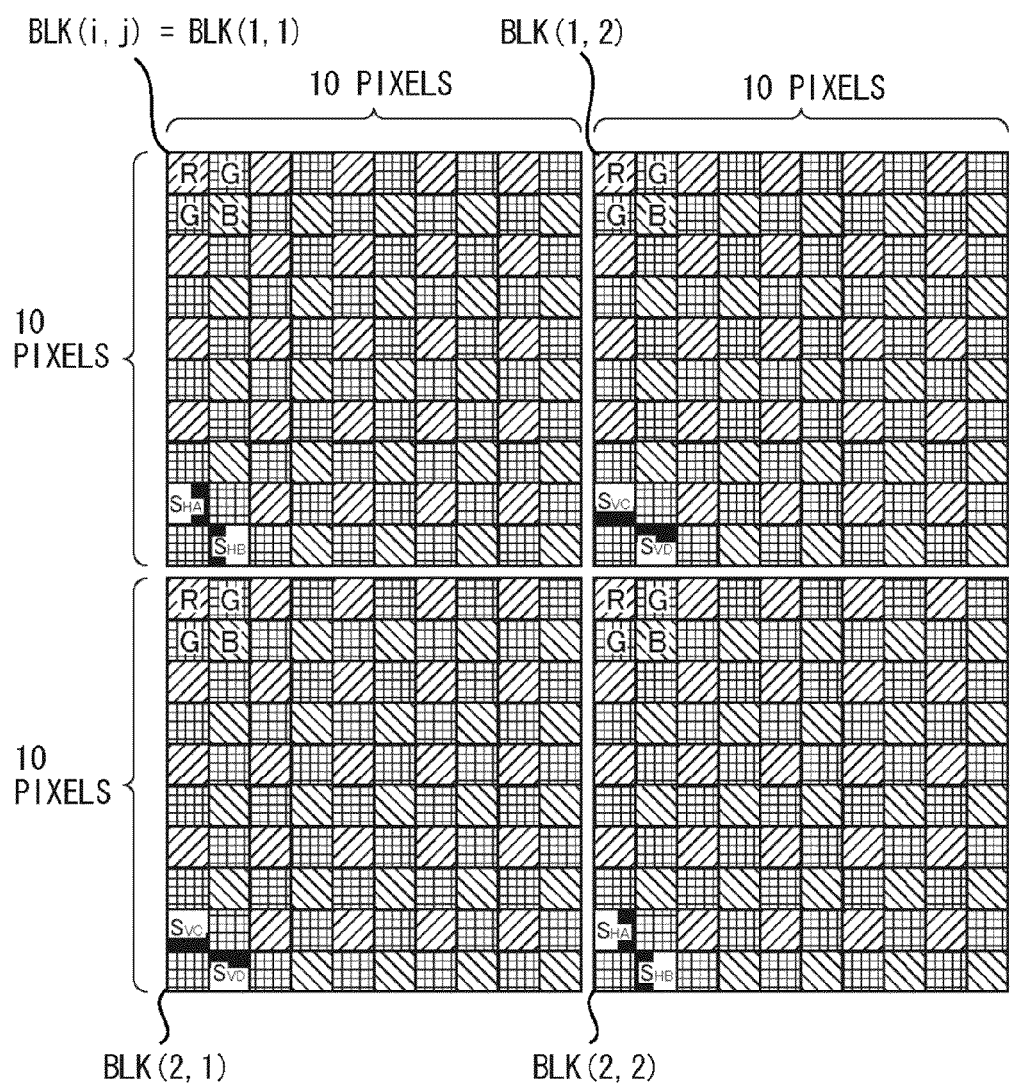
FIG. 8 illustrates an example of pixel arrangement of a minimum unit of the image sensor according to the first exemplary embodiment of the present invention.
Figure 9:
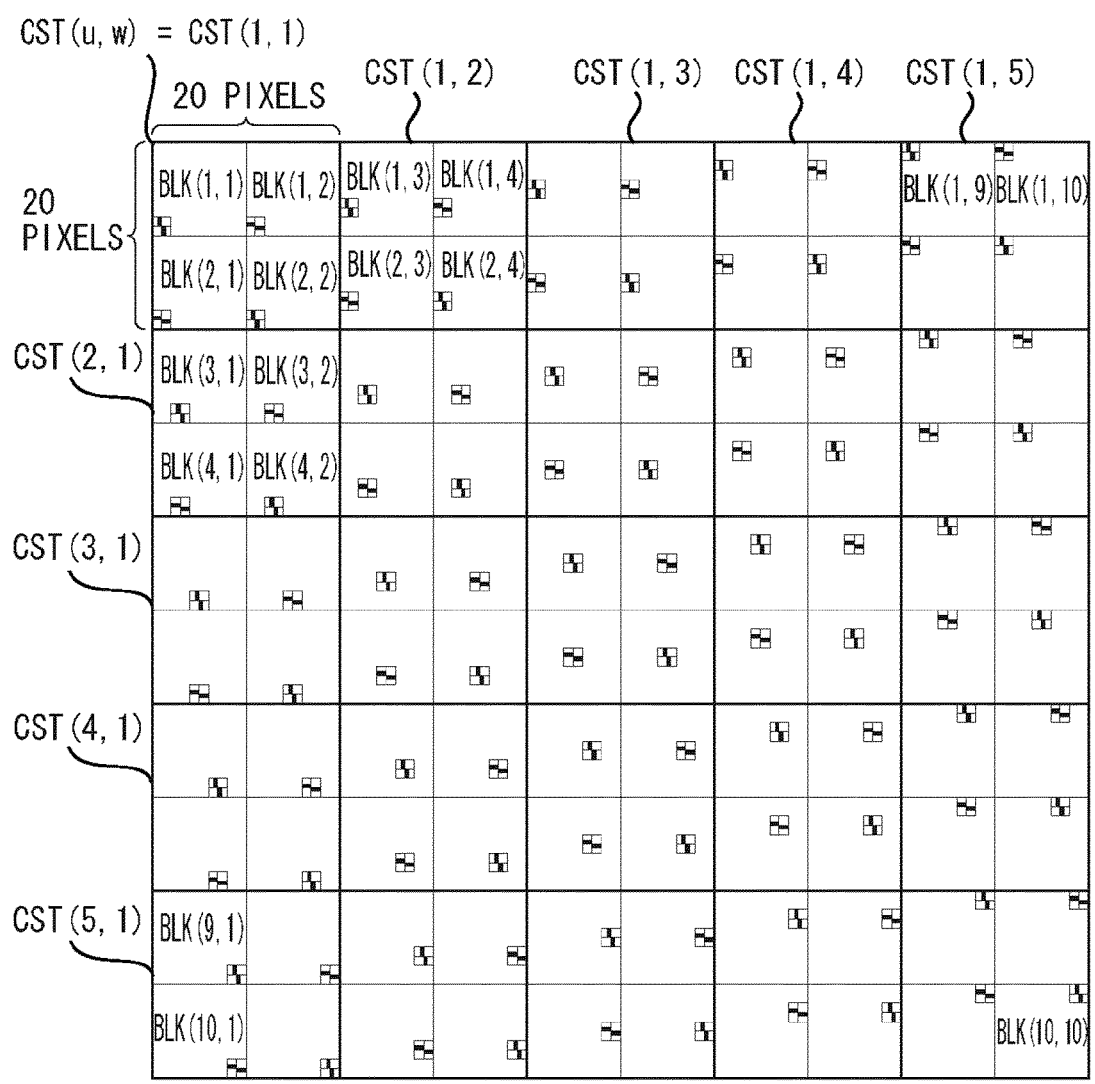
FIG. 9 illustrates an example of the pixel arrangement of a higher order unit of the image sensor according to the first exemplary embodiment of the present invention.
Figure 10:
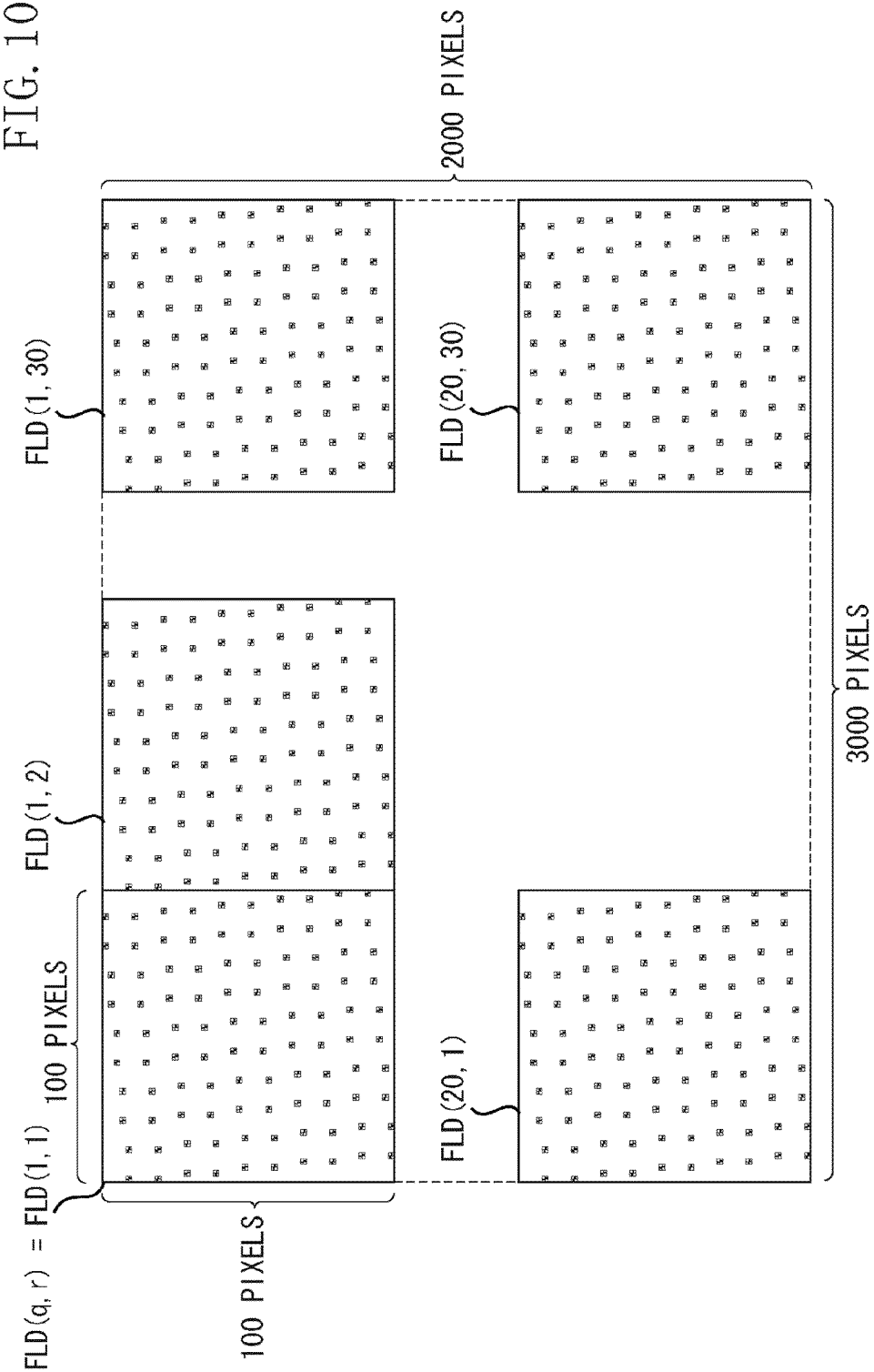
FIG. 10 illustrates an example of the pixel arrangement in the entire area of the image sensor according to the first exemplary embodiment of the present invention.

FIGS. 8 through 10 illustrate an exemplary method of arranging the imaging pixel and the focus detection pixel described above with reference to FIGS. 5 through 7.

FIG. 8 illustrates an exemplary method for arranging minimum unit-components when focus detection pixels are discretely arranged between imaging pixels.

Referring to FIG. 8, one unitary block includes one hundred (10 (lateral)×10 (longitudinal)) pixels. In a block BLK (1, 1), which is arranged in an upper-left portion in the example illustrated in FIG. 8, R and B pixels, which are arranged in a lower-left array of the block BLK (1, 1), are substituted with a pair of focus detection pixels SHA and SHB. The focus detection pixels SHA and SHB are targets of pupil division in the horizontal direction.

In a block BLK (1, 2), which is arranged on the right side of the block BLK (1, 1), R and B pixels, which are arranged in a lower-left array of the block BLK (1, 2), are substituted with a pair of focus detection pixels SVC and SVD. The focus detection pixels SVC and SVD are targets of pupil division in the vertical direction.

A block BLK (2, 1), which is arranged on the block BLK (1, 1), has the same pixel arrangement as that of the block BLK (1, 2). A block BLK (2, 2), which is arranged on the right side of the block BLK (2, 1), has the same pixel arrangement as that of the first block BLK (1, 1).

To universally describe the above-described arrangement method, in a block BLK (i, j), if "i+j" is an even numerical value, focus detection pixels for horizontal pupil division are to be arranged. If "i+j" is an odd numerical value, focus detection pixels for vertical pupil division are to be arranged.

Further, four (2×2) blocks including four hundred (20 (lateral)×20 (longitudinal)) pixels are used as an arrangement unit higher than a block. A unit used in the arrangement method described above is defined as and will hereafter be referred to as a "cluster".

FIG. 9 illustrates an arrangement method of the cluster as a unit.

Referring to FIG. 9, an upper-left cluster, which includes four hundred (20 (lateral)×20 (longitudinal)) pixels, is a cluster CST (u, w) (=CST (1, 1)). In the cluster CST (1, 1), R and B pixels, which are arranged in a lower-left portion of each block, are substituted with the focus detection pixels SHA and SHB or SVC and SVD.

In a cluster CST (1, 2), which is provided on the right side of the cluster (1, 1), the focus detection pixels within the block are arranged at a location closer to the top edge of the cluster than the cluster CST (1, 1) by a difference equivalent to two pixels.

In a cluster CST (2, 1), which is provided immediately below the first cluster (1, 1), the focus detection pixels within the block are arranged at a location closer to the right edge of the cluster than the cluster CST (1, 1) by a difference equivalent to two pixels.

The pixel arrangement illustrated in FIG. 9 can be achieved by repeatedly executing the above-described arrangement method.

To universally describe the above-described arrangement method, the following can apply. More specifically, for the coordinates of the focus detection pixel, four pixels including the G pixels illustrated in FIG. 6A or FIG. 7A are used as one unit (pixel pair) and the coordinates of a pixel arranged at an upper-left pixel thereof are used. For the coordinates within the block, the upper-left portion thereof is provided with the coordinates "(1, 1)". The coordinates increases downwards and rightwards.

According to the above-described definition, in the cluster CST (u, w), a focus detection pixel pair in each block has a horizontal coordinate "2×u−1" and a vertical coordinate "11−2×w".

Further, twenty-five (5×5) clusters including ten thousand (100 (lateral)×100 (longitudinal)) pixels are used as an arrangement unit higher than a cluster. The above-described arrangement unit higher than a cluster is defined as and will hereafter be referred to as a "field".

FIG. 10 illustrates a method for arranging the above-described fields, each of which being a unit to be arranged.

Referring to FIG. 10, an upper-left field, which includes ten thousand (100 (lateral)×100 (longitudinal)) pixels, is a field FLD (q, r) (=FLD (1, 1)). In the present exemplary embodiment, all fields FLD (q, r) have the same arrangement as that of the first field FLD (1, 1).

If thirty fields FLD (1, 1) are arranged in the horizontal direction and twenty in the vertical direction, an imaging area including 6,000,000 (3,000 (lateral)×2,000 (longitudinal)) pixels includes 600 fields. In the above-described manner, the present exemplary embodiment can evenly distribute focus detection pixels on the entire imaging area.

Now, a method for grouping pixels and a method for adding a signal (calculation method), which are executed during the focus detection, will be described in detail below with reference to FIGS. 11 through 14.

Figure 11:
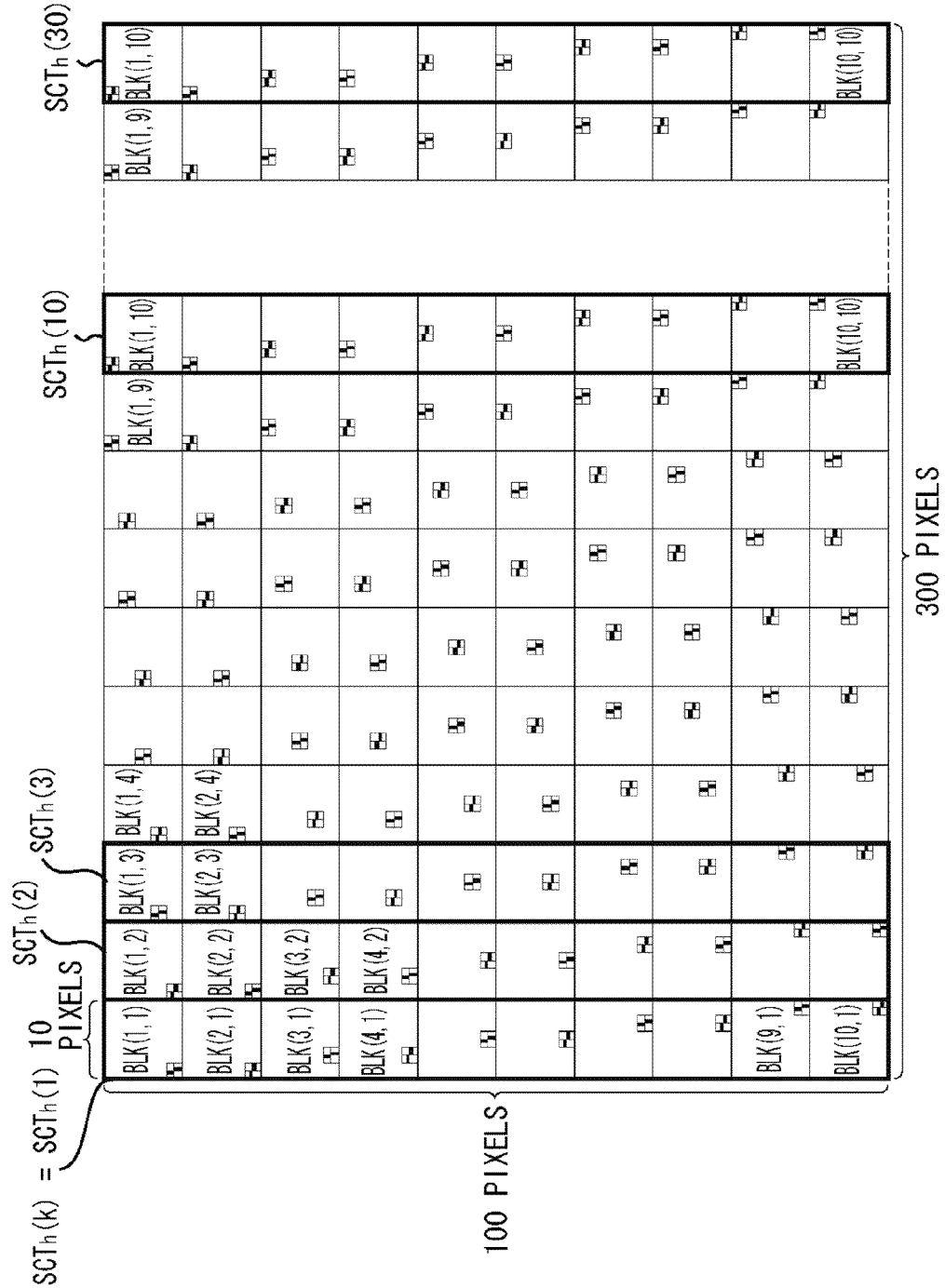
FIG. 11 illustrates an example of a method for grouping the pixels executed during horizontal defocus detection according to the first exemplary embodiment of the present invention.

FIG. 11 illustrates an example of a pixel grouping method executed during horizontal defocus amount detection of an object image formed by the photographic optical system according to the present exemplary embodiment. "Horizontal defocus amount detection" refers to phase difference focus detection executed by using focus detection pixels for dividing the exit pupil of the photographic optical system (FIG. 6B) in the lateral (left-to-right or horizontal) direction.

In the example illustrated in FIG. 11, the pixels are arranged in the same manner as illustrated in FIG. 9. For the focus detection, a group including 10 blocks in total (one block in the lateral direction and ten blocks in the longitudinal direction) is defined as a "section". One focus detection area includes thirty sections arranged in the lateral direction. More specifically, a focus detection area includes 30,000 (100 (longitudinal)×300 (lateral)) pixels. In the present exemplary embodiment, a focus detection area described above is defined as an AF area.

One section includes five pixels SHA, which are to be subjected to one pupil division in the lateral direction, and five pixels SHB, which are to be subjected to the other pupil division. The present exemplary embodiment calculates an additional value by executing addition on the output of the five pixels SHA to obtain one AF pixel of one image signal to be used for phase difference calculation (an image A). Similarly, the present exemplary embodiment calculates an additional value by executing addition on the output of the five pixels SHB to obtain the other AF pixel of the other image signal to be used for phase difference calculation (an image B).

Figure 12A:
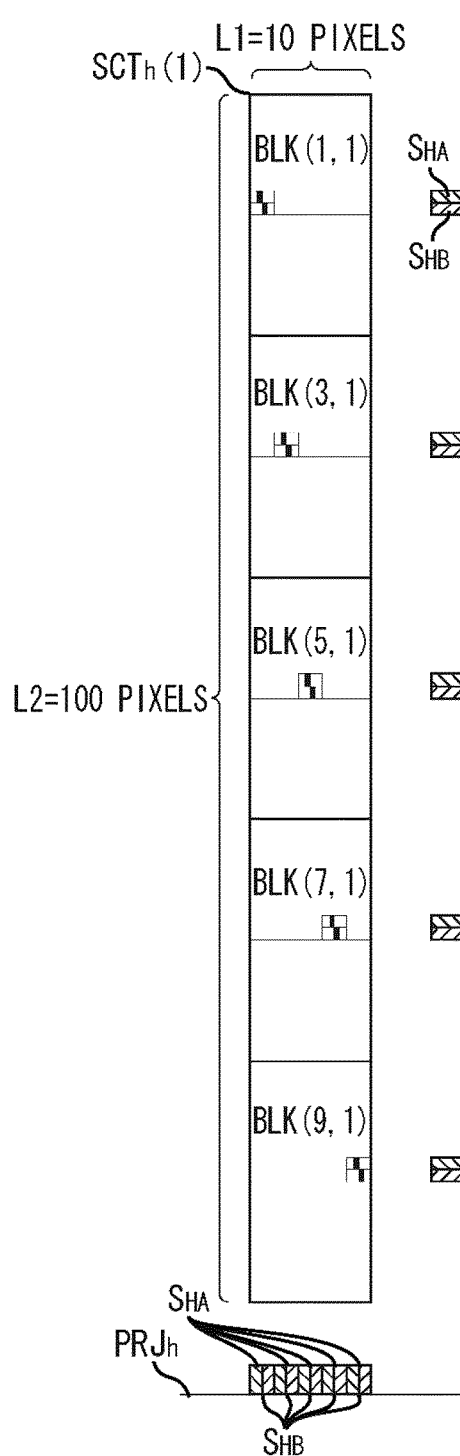
FIGS. 12A and 12B illustrate an example of an image sampling characteristic acquired during horizontal defocus detection according to the first exemplary embodiment of the present invention.
Figure 12B:
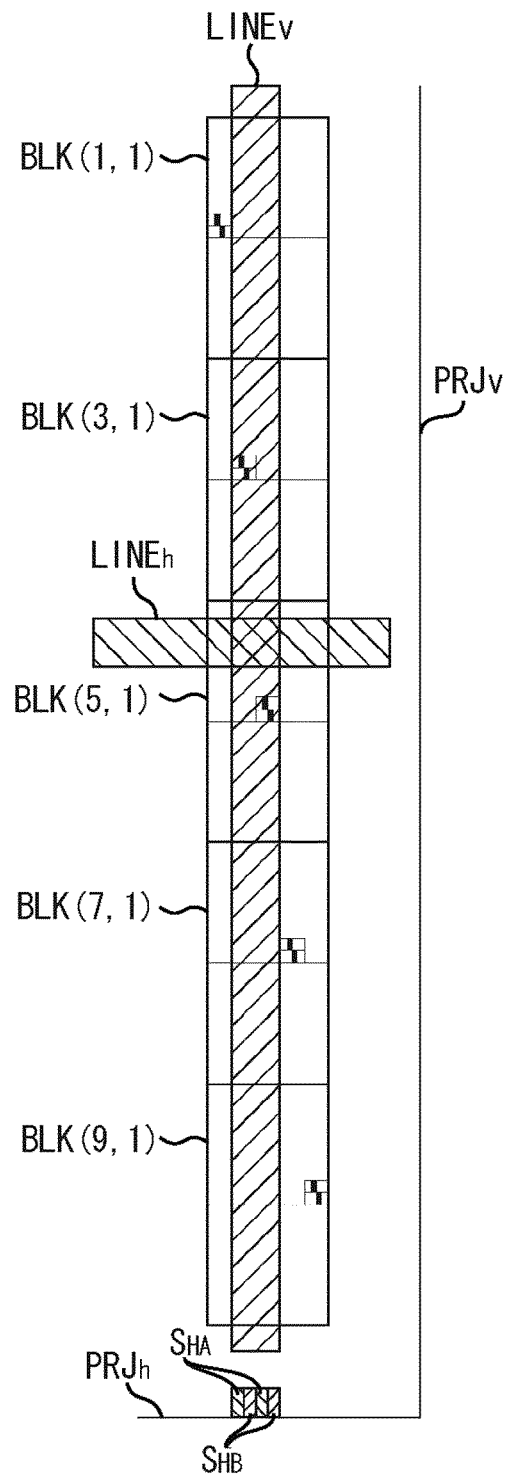

FIGS. 12A and 12B are diagrams illustrating a capacity of one section for capturing an object image. FIG. 12A illustrates a leftmost section of the example illustrated in FIG. 11.

Referring to FIG. 12A, a horizontal line PRJh, which is a horizontal line illustrated below the section, is a first projection line extended in the direction of the pupil division of the focus detection pixels SHA and SHB. In addition, a vertical line PRJv, which is a vertical line illustrated to the right side of the section, is a second projection line extended in a direction perpendicular to the direction of the pupil division of the focus detection pixels SHA and SHB.

In the example illustrated in FIG. 12A, all the pixels SHA within one section are added. Furthermore, all the pixels SHB within one section also are added. If one section is regarded as having one AF pixel and if the light receiving portion of one AF pixel is projected on the projection line PRJh in the direction of the pupil division, then it can be seen that a pixel SHA and a pixel SHB are arranged in intense alternate order.

An arrangement pitch P1 of arranging pixels SHA on the projection line PRJh in the direction of the pupil division equals PHh (=2 (pixels)). If the above-described arrangement of the pixels SHA is expressed by a space frequency F1 instead of expressing the same by the arrangement pitch, then F1=0.5 (unit: pixel/pixel).

Similarly, an arrangement pitch P1 of arranging pixels SHB on the projection line PRJh in the direction of the pupil division equals PHh (=2 (pixels)). If the above-described arrangement of the pixels SHB is expressed by a space frequency F1 instead of expressing the same by the arrangement pitch, then F1=0.5 (unit: pixel/pixel).

On the other hand, if the light receiving portion included in one AF pixel is projected on the projection line PRJv, which is perpendicular to the direction of pupil division, then it can be seen that the pixels SHA and SHB are arranged in a dispersed manner.

An arrangement pitch P2 of arranging pixels SHA on the projection line PRJv in the direction of the pupil division equals PHv (=20 (pixels)). If the above-described arrangement of the pixels SHA is expressed by a space frequency F2 instead of expressing the same by the arrangement pitch, then F2=0.05 (unit: pixel/pixel).

Similarly, an arrangement pitch P2 of arranging pixels SHB on the projection line PRJv in the direction of the pupil division equals PHv (=20 (pixels)). If the above-described arrangement of the pixels SHB is expressed by a space frequency F2 instead of expressing the same by the arrangement pitch, then F2=0.05 (unit: pixel/pixel).

In other words, the distribution characteristic of the AF pixel according to the present exemplary embodiment before the above-described grouping is executed equals the arrangement pitch in the direction of pupil division and that in a direction perpendicular to the pupil division direction.

In addition, the present exemplary embodiment reduces a sampling error in the pupil division direction by using a rectangle as the shape of the above-described group. More specifically, in the present exemplary embodiment, a maximum dimension of one section in the pupil division direction L1 is the dimension equivalent to ten pixels while a maximum dimension of one section in the direction perpendicular to the pupil division direction L2 is equivalent to one hundred pixels.

In other words, in the present exemplary embodiment, the sectional dimensions L1 and L2 have a relationship "L1<L2". Accordingly, in the present exemplary embodiment, the sampling frequency F1 in the pupil division direction is increased to a high (intense) frequency while the sampling frequency F2 in the direction perpendicular to the pupil division direction F2 is reduced to a low (dispersed) frequency.

FIG. 12B is a diagram illustrating a capacity of the AF pixel (one section) described above with reference to FIG. 12A to capture an image when an object image indicated by a thin line (indicated as a shaded portion in FIG. 12B) is projected thereon.

Referring to FIG. 12B, a LINEv indicates a thin vertical (longitudinal) line projected on the image sensor 107. The LINEv has a width equivalent to the total dimension of four pixels (8 μm on an actual image). In the example illustrated in FIG. 12B, in a section SCTh(1), the focus detection pixels included in blocks BLK (3, 1) and (5, 1) capture an object image.

The minimum dimension of an object image is determined according to aberrations that may occur within the first lens unit 101 and the characteristic of the optical low-pass filter 106, which is provided on the front surface of the image sensor 107. An object image generally has a width equivalent to two pixels or wider if the object is a very thin line. Accordingly, an image is captured by using at least one pixel SHA and at least one pixel SHB within one section according to the present exemplary embodiment. Thus, the present exemplary embodiment does not leave an uncaptured portion of a target image.

On the other hand, a LINEh (FIG. 12B) indicates a thin lateral line projected on the image sensor 107. The thin lateral line has a width equivalent to four pixels (8 μm on an actual image), similar to the width of the above-described LINEv. In the example illustrated in FIG. 12B, the lateral line LINEh is superposed on the block BLK (5, 1). Accordingly, the lateral line LINEh is not captured by the focus detection pixels SHA and SHB.

However, because the section SCTh(1) is used for the focus detection on an object whose luminance is distributed in the lateral direction, such as a vertical (longitudinal) line, if any portion of an image of an object whose luminance is distributed in the vertical direction (i.e., a lateral line) is not captured by the focus detection pixels, the uncaptured portion does not affect the image quality.

Figure 13:
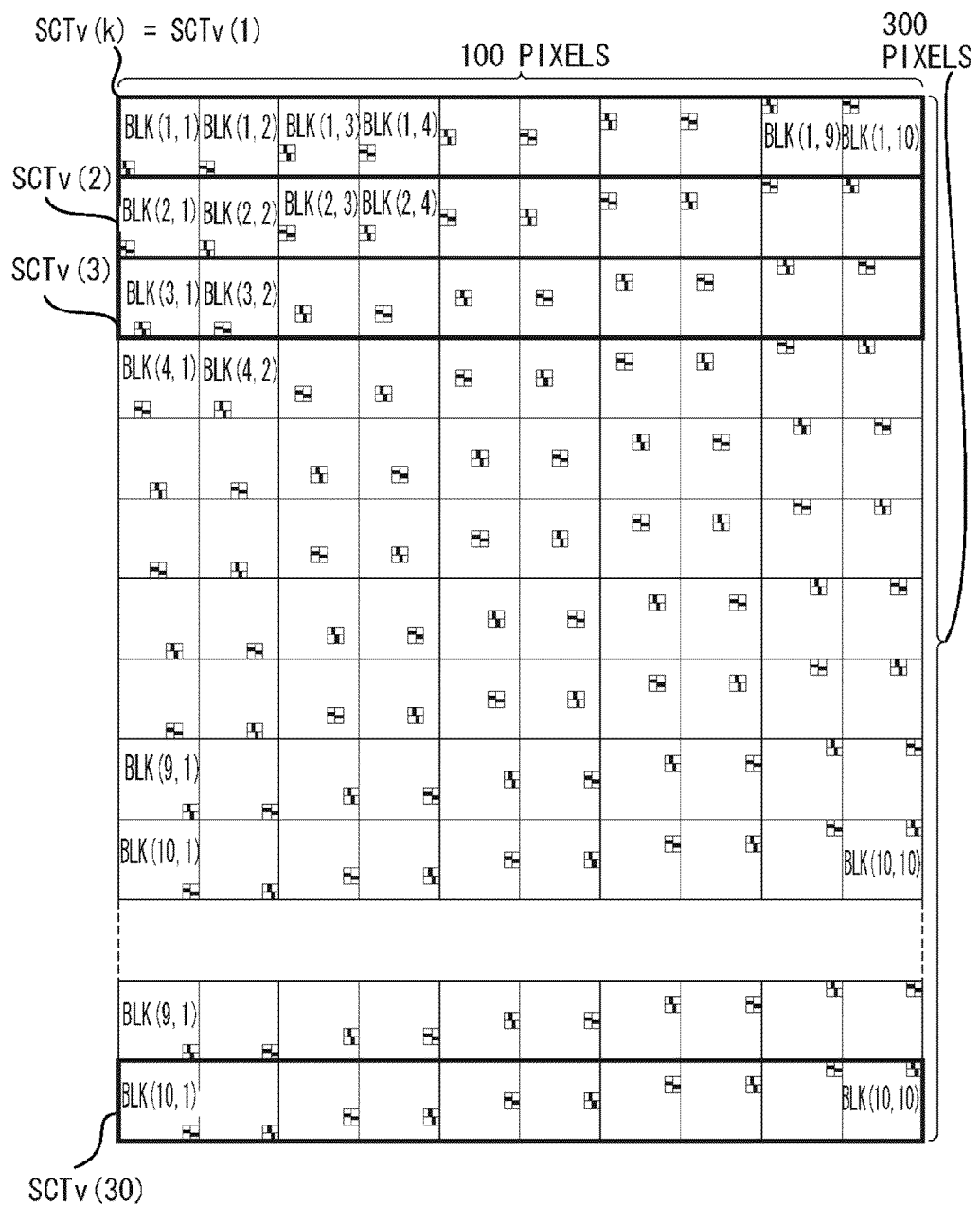
FIG. 13 illustrates an example of a method for grouping the pixels executed during vertical defocus detection according to the first exemplary embodiment of the present invention.

FIG. 13 illustrates an example of a pixel grouping method executed during vertical defocus amount detection of an object image formed by the photographic optical system according to the present exemplary embodiment. "Vertical defocus amount detection" refers to phase difference focus detection executed by using focus detection pixels for dividing the exit pupil of the photographic optical system (FIG. 7B) in the longitudinal (vertical or perpendicular) direction. More specifically, the "vertical defocus amount detection" is equivalent to a focus detection method executed by performing the method described above with reference to FIG. 11 in a direction perpendicular to the direction of executing the method illustrated in FIG. 11.

In the example illustrated in FIG. 13, the pixels are arranged in the same manner as illustrated in FIG. 9. For the focus detection, a group including 10 blocks in total (ten blocks in the lateral direction and one block in the longitudinal direction) is defined as a "section". One focus detection area includes thirty sections arranged in the longitudinal direction. More specifically, a focus detection area includes 30,000 (100 (lateral)×300 (longitudinal)) pixels. In the present exemplary embodiment, a focus detection area described above is defined as an AF area, similar to the example illustrated in FIG. 11.

One section includes five pixels SVC, which are to be subjected to one pupil division in the longitudinal direction, and five pixels SVD, which are to be subjected to the other pupil division. The present exemplary embodiment calculates an additional value by executing addition on the output of the five pixels SVC to obtain one AF pixel of one image signal to be used for phase difference calculation (an image C). Similarly, the present exemplary embodiment calculates an additional value by executing addition on the output of the five pixels SVD to obtain the other AF pixel of the other image signal to be used for phase difference calculation (an image D).

FIGS. 14A and 14B illustrate a capacity of one section for capturing an object image. The example illustrated in FIGS. 14A and 14B is equivalent to a method executed by performing the method described above with reference to FIGS. 12A and 12B in a direction perpendicular to the direction of executing the method illustrated in FIGS. 12A and 12B.

FIG. 14A illustrates a top section of the example illustrated in FIG. 13. Referring to FIG. 14A, a vertical line PRJv, which is a vertical line illustrated in a rightmost portion of the section, is a third projection line extended in the direction of the pupil division of the focus detection pixels SVC and SVD. In addition, a vertical line PRJh, which is a horizontal line illustrated at the bottom of the section, is a fourth projection line extended in a direction perpendicular to the direction of the pupil division of the focus detection pixels SVC and SVD.

In the example illustrated in FIG. 14A, all the pixels SVC within one section are added. Furthermore, all the pixels SVD within one section also are added. If one section is taken as having one AF pixel and if the light receiving portion of one AF pixel is projected on the projection line PRJv in the direction of the pupil division, then it can be seen that a pixel SVC and a pixel SVD are arranged in intense alternate order.

An arrangement pitch P1 of arranging pixels SVC on the projection line PRJv in the direction of the pupil division equals PVv (=2 (pixels)). If the above-described arrangement of the pixels SVC is expressed by a space frequency F1 instead of expressing the same by the arrangement pitch, then F1=0.5 (unit: pixel/pixel).

Similarly, an arrangement pitch P1 of arranging pixels SVD on the projection line PRJv in the direction of the pupil division equals PVv (=2 (pixels)). If the above-described arrangement of the pixels SVD is expressed by a space frequency F1 instead of expressing the same by the arrangement pitch, then F1=0.5 (unit: pixel/pixel).

On the other hand, if the light receiving portion included in one AF pixel is projected on the projection line PRJh, which is perpendicular to the direction of pupil division, then it can be seen that the pixels SVC and SVD are arranged in a dispersed manner.

An arrangement pitch P2 of arranging pixels SVC on the projection line PRJh in the direction of the pupil division equals PVh (=20 (pixels)). If the above-described arrangement of the pixels SVC is expressed by a space frequency F2 instead of expressing the same by the arrangement pitch, then F2=0.05 (unit: pixel/pixel).

Similarly, an arrangement pitch P2 of arranging pixels SVD on the projection line PRJv in the direction of the pupil division equals PVh (=20 (pixels)). If the above-described arrangement of the pixels SVD is expressed by a space frequency F2 instead of expressing the same by the arrangement pitch, then F2=0.05 (unit: pixel/pixel).

As described above, the sampling characteristic of the AF pixel illustrated in FIG. 14A has a relationship similar to that described above with reference to FIGS. 12A and 12B (i.e., "F1>F2") according to the pupil division direction. This is because in the section illustrated in FIG. 14A also, the dimension of the section in the pupil division direction L1 and the dimension of the section in a direction perpendicular to the pupil division direction L2 have the relationship "L1<L2".

FIG. 14B is a diagram illustrating a capacity of the AF pixel (one section) described above with reference to FIG. 14A to capture an image when an object image indicated by a thin line (indicated as a shaded portion in FIG. 14B) is projected thereon.

Referring to FIG. 14B, a LINEh indicates a thin lateral (horizontal) line projected on the image sensor 107. The LINEh has a width equivalent to the total dimension of four pixels (8 μm on an actual image). In the example illustrated in FIG. 14B, in a section SCTv(1), the focus detection pixels included in blocks BLK (1, 4) and (1, 6) capture an object image.

On the other hand, a LINEv (FIG. 14B) indicates a thin longitudinal (vertical) line projected on the image sensor 107. The thin longitudinal line has a width equivalent to four pixels (8 μm on an actual image), similar to the width of the above-described LINEh. In the example illustrated in FIG. 14B, the lateral line LINEv is superposed on the block BLK (1, 6).

Accordingly, the lateral line LINEv is not captured by the focus detection pixels SVC and SVD.

However, because the section SCTv(1) is used for the focus detection on an object whose luminance is distributed in the longitudinal direction, such as a horizontal (lateral) line, if any portion of an image of an object whose luminance is distributed in the lateral direction (i.e., a vertical line) is not captured by the focus detection pixels, the uncaptured portion does not affect the image quality.

Figure 15:
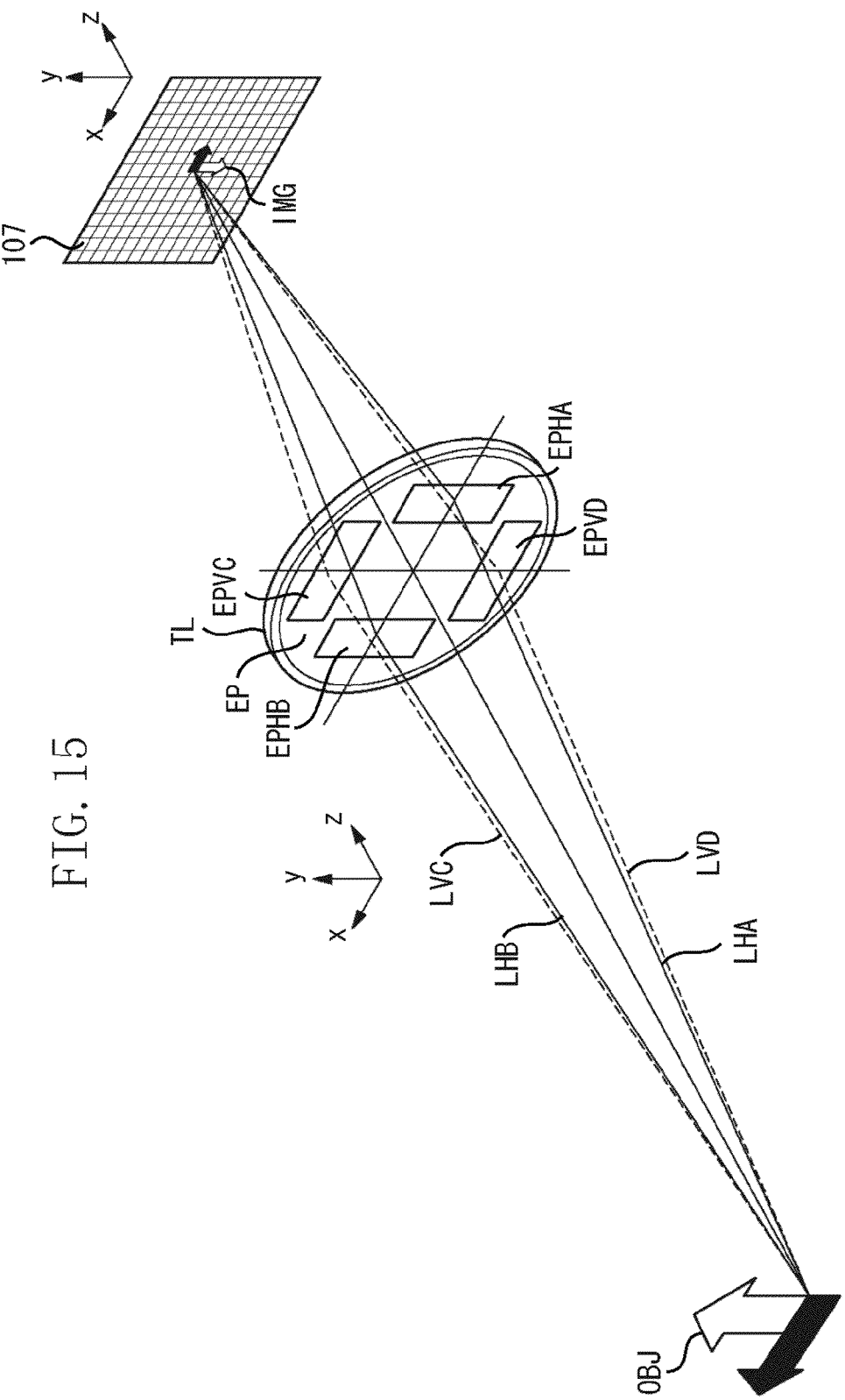
FIG. 15 illustrates exemplary pupil division on the image sensor according to the first exemplary embodiment of the present invention.

FIG. 15 illustrates an example of a state of pupil division on the image sensor 107 according to the present exemplary embodiment. In the example illustrated in FIG. 15, the image sensor 107 captures an object (OBJ) image (IMG) via the photographic optical system TL.

Similar to the example illustrated in FIG. 5B, an imaging pixel receives a light flux that has passed through the entire exit pupil EP of the photographic optical system.

On the other hand, the focus detection pixel includes a pupil division function as described above with reference to FIGS. 6A through 7B.

More specifically, the pixel SHA (FIG. 6A) receives a light flux that has passed through a pupil existing in a left portion of the photographic optical system TL when a lens back surface (surface located close to the image side) of the photographic optical system TL is viewed from the image plane of the image sensor 107 (i.e., a light flux that has passed through a pupil EPHA illustrated in FIG. 15).

Similarly, the pixels SHB, SVC, and SVD receive a light flux that has passed through pupils EPHB, EPVC, and EPVD, respectively. In addition, the focus detection pixels are distributed in the entire area of the image sensor 107 as described above with reference to FIG. 10. Accordingly, the present exemplary embodiment can execute the focus detection over the entire imaging area.

Figure 16:
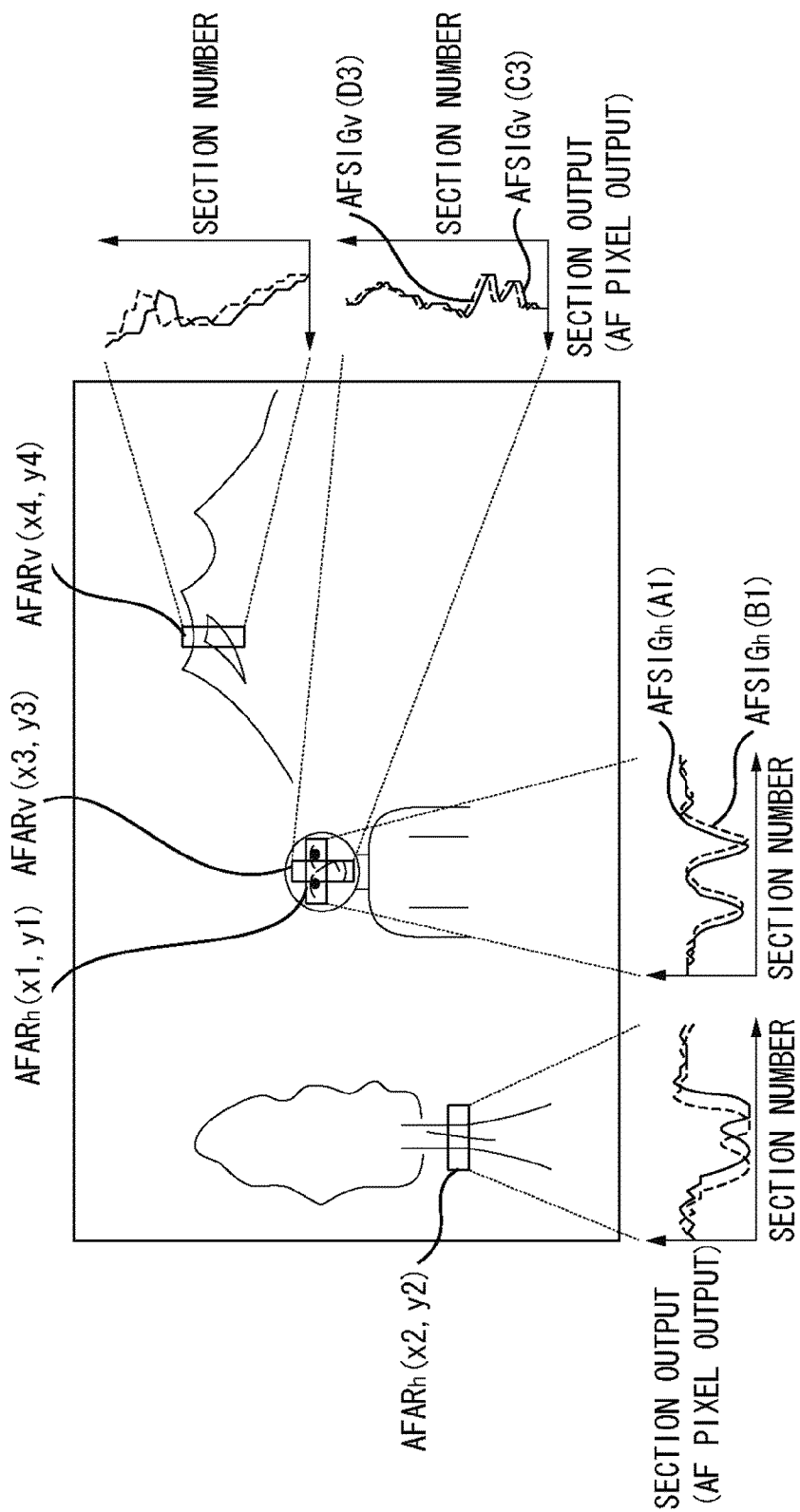
FIG. 16 illustrates an example of a focus detection area according to the first exemplary embodiment of the present invention.

FIG. 16 illustrates an example of an image acquired during focus detection and a focus detection area according to the present exemplary embodiment.

Referring to FIG. 16, the object image formed on the image plane includes an image of a person in the central portion thereof, an image of a tree, which is a short-distance view captured in a left portion of the object image, and an image of mountains, which is a long-distance view captured in a right portion of the object image.

In the present exemplary embodiment, a plurality of pairs of horizontal defocus amount detection pixels SHA and SHB and a plurality of pairs of vertical defocus amount detection pixels SVC and SVD are arranged in the entire imaging area at an even density as illustrated in FIG. 10.

During the horizontal defocus amount detection, the present exemplary embodiment forms a group of AF pixel signals, which are used for calculating the phase difference, in the manner illustrated in FIGS. 11 through 12B. During the vertical defocus amount detection, the present exemplary embodiment forms a group of AF pixel signals, which are used for calculating the phase difference, in the manner illustrated in FIGS. 13 through 14B. Accordingly, a focus detection area, which is used for detecting horizontal defocus and vertical defocus, can be set at an arbitrary location in the imaging area.

In the example illustrated in FIG. 16, an image of the face of a person is located in the central portion of the image plane. If it is detected that an image of the face of a person exists on the image plane, then the present exemplary embodiment sets a focus detection area AFARh (x1, y1) for detecting a horizontal defocus amount and a focus detection area AFARv (x3, y3) for detecting a vertical defocus amount within an area including the image of the face of the person.

A subscript "h" of the focus detection area AFARh indicates the horizontal direction while a subscript "v" of the focus detection area AFARv indicates the vertical direction. The coordinate pairs (x1, y1) and (s3, y3) each indicate coordinates of the upper-left portion of the focus detection area.

A signal of an image A AFSIGh (A1), which is used for the phase difference detection, is generated by adding five focus detection pixels SHA included in each section of the focus detection area AFARh (x1, y1) and continuously arranging the five focus detection pixels SHA within thirty sections.

A signal of an image B AFSIGh (B1), which is used for the phase difference detection, is generated by adding five focus detection pixels SHB included in each section of the focus detection area AFARh (x1, y1) and continuously arranging the five focus detection pixels SHB within thirty sections.

The present exemplary embodiment calculates a relative horizontal defocus amount between the image A-signal AFSIGh (A1) and the image B-signal AFSIGh (B1) by using a publicly known correlation calculation method. Thus, the present exemplary embodiment can calculate a defocus amount of an object.

Further, the present exemplary embodiment calculates a defocus amount for the focus detection area AFARv (x3, y3) in the above-described manner. It is useful to employ a more highly dependable defocus amount value of two defocus amount values detected from the horizontal- and vertical-focus detection areas.

On the other hand, in the example illustrated in FIG. 16, the image of a trunk of the tree located in the left portion of the image plane primarily has a longitudinal component (i.e., the luminance thereof is distributed in the lateral direction). Accordingly, the present exemplary embodiment determines that the object is to be subjected to the horizontal focus detection. Accordingly, the present exemplary embodiment sets a focus detection area AFARh (x2, y2) for horizontal defocus detection.

Moreover, in the example illustrated in FIG. 16, the image of a ridge lines of the mountains, which is located in the right portion of the image plane, primarily has a lateral component (i.e., the luminance thereof is distributed in the longitudinal direction). Accordingly, the present exemplary embodiment determines that the object is to be subjected to the vertical focus detection. Accordingly, the present exemplary embodiment sets a focus detection area AFARv (x4, y4) for vertical defocus detection.

As described above, in the present exemplary embodiment, the focus detection areas for the horizontal and vertical detection can be set at arbitrary locations on the image plane. Accordingly, the present exemplary embodiment can always execute the focus detection correctly with a high accuracy even if the object image is projected at various different locations and if the luminance of the object image is distributed in various different directions.

Figure 17:
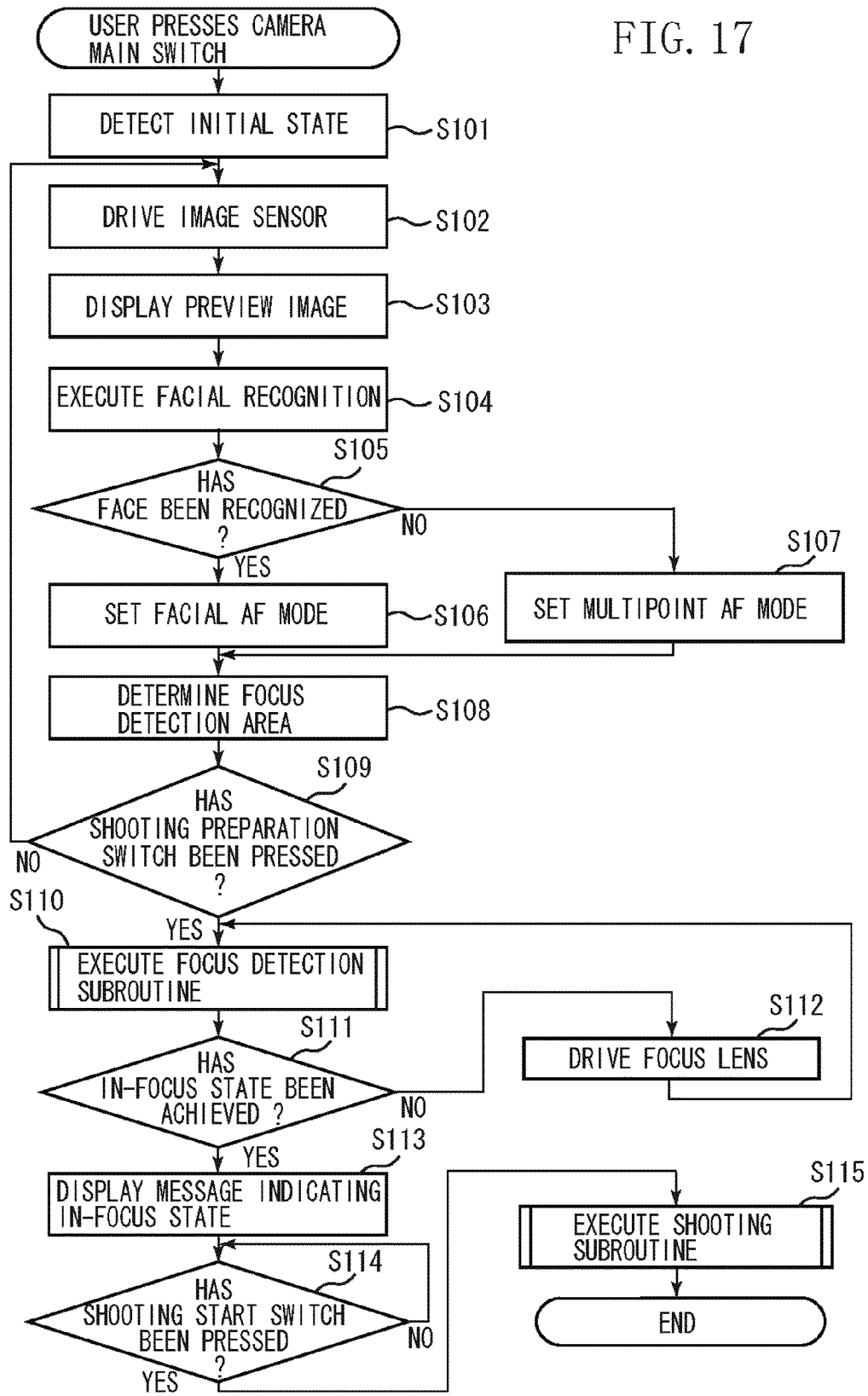
FIG. 17 is a flow chart illustrating exemplary main control according to the first exemplary embodiment of the present invention.
Figure 18:
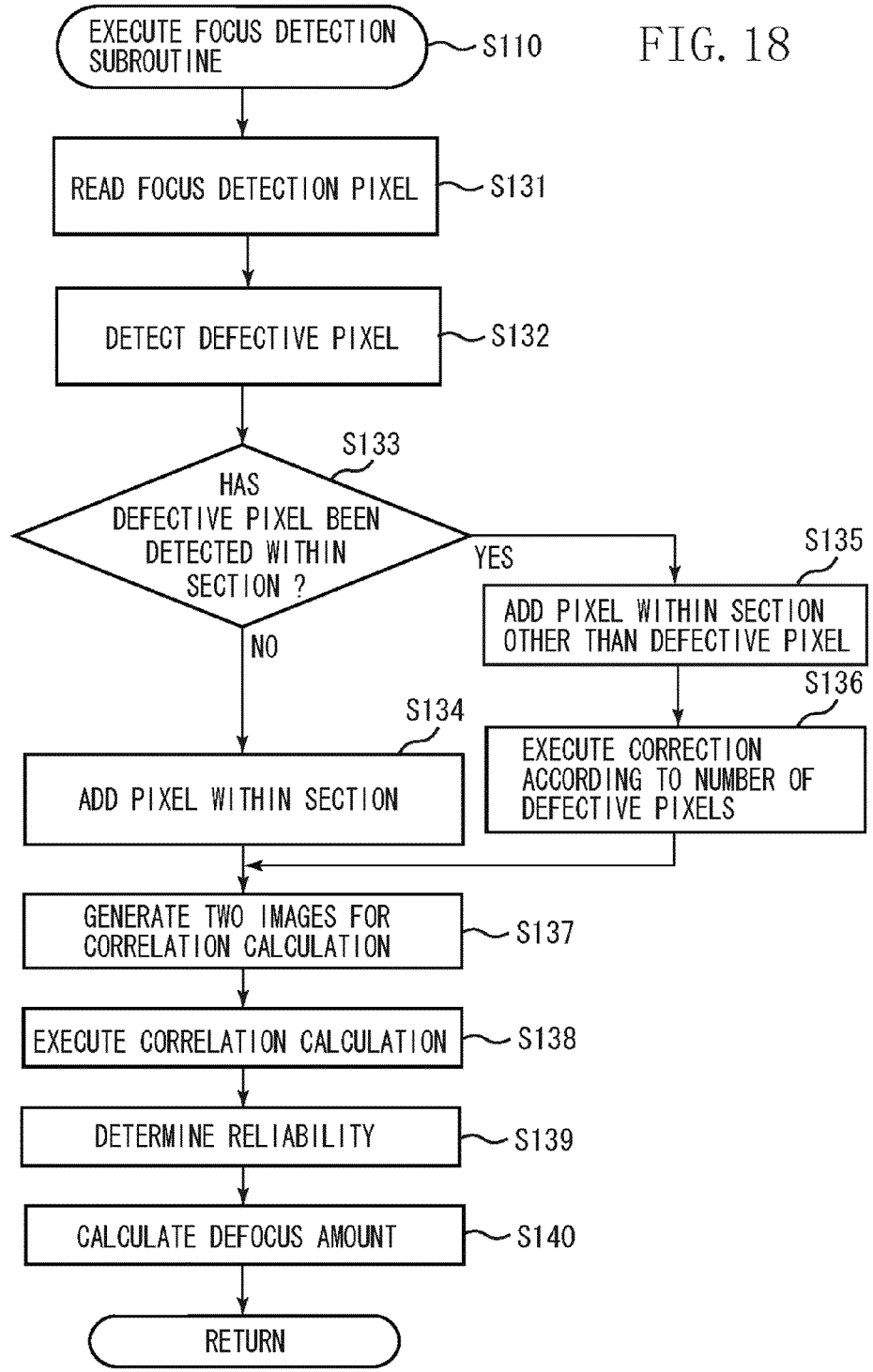
FIG. 18 is a flow chart illustrating an exemplary focus detection subroutine according to the first exemplary embodiment of the present invention.
Figure 19:
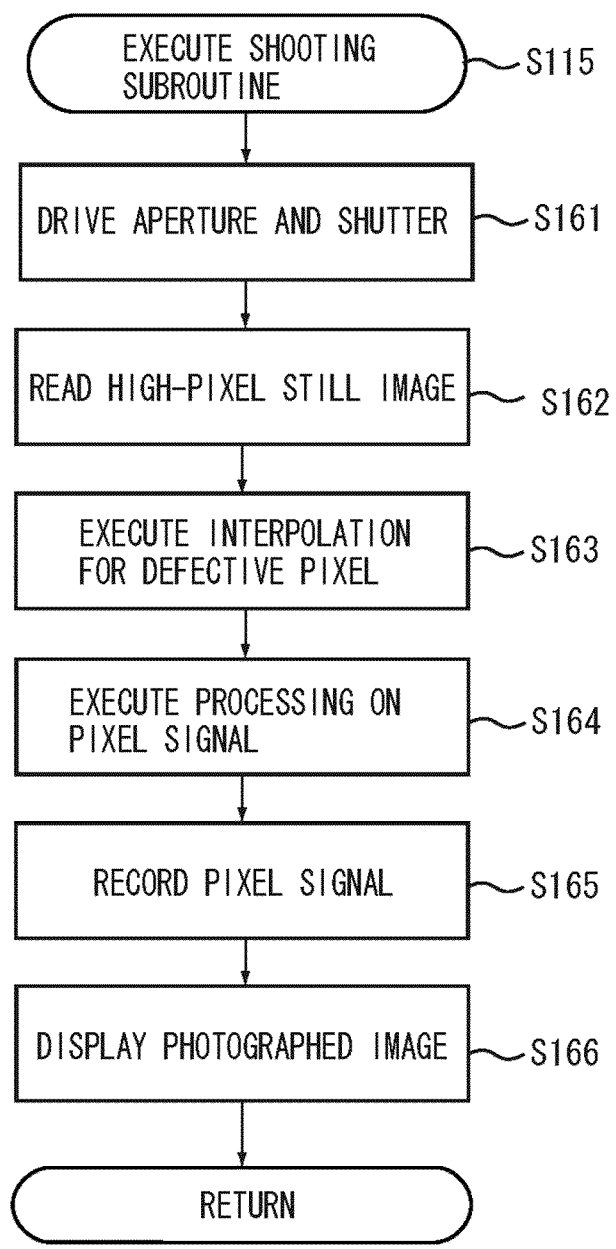
FIG. 19 is a flow chart illustrating an exemplary image taking subroutine according to the first exemplary embodiment of the present invention.

FIGS. 17 through 19 are flow charts illustrating exemplary focusing and shooting processing executed by the camera according to the present exemplary embodiment. Hereinbelow, the primary control described in FIGS. 17 through 19 will be described in detail below with reference to each of FIGS. 1 through 16 described above.

FIG. 17 is a main flowchart illustrating an exemplary operation of the camera according to the present exemplary embodiment.

Referring to FIG. 17, when the photographer (the user of the camera) presses the power switch of the camera, the processing starts. In step S101, the CPU 121 verifies the operation of and activates each actuator and the image sensor 107 of the camera. In addition, the CPU 121 initializes the content stored on the memory and a program to be executed. Furthermore, the CPU 121 starts a shooting preparation operation.

In step S102, the CPU 121 starts an imaging operation of the image sensor 107. In addition, the CPU 121 outputs a low pixel value-moving image, which is used as a preview image.

In step S103, the CPU 121 displays the read moving image on the display unit 131. The display unit 131 is provided on the back surface of the camera. The photographer can view the displayed preview image to designate the composition of the image to be shot.

In step S104, the CPU 121 executes face recognition on the preview moving image by using a publicly known face recognition method. In step S105, the CPU 121 determines whether an image of the face of a person exists within the preview moving image.

If it is determined that an image of the face of a person exists within the preview moving image (YES in step S105), then the processing advances to step S106. In step S106, the CPU 121 sets the focusing mode to a face AF mode. In the present exemplary embodiment, a "face AF mode" refers to an AF mode for focusing on the face of a person existing within the imaging area.

On the other hand, if it is determined that no image of the face of a person exists within the preview moving image (NO in step S105), then the processing advances to step S107. In step S107, the CPU 121 sets the focusing mode to a multipoint AF mode. A "multipoint AF mode" refers to an operation mode for executing the following operations. More specifically, in the multipoint AF mode, the CPU 121 divides the imaging area, for example, into fifteen areas (3×5 areas). Then, the CPU 121 executes the focus detection on each divided area. In addition, the CPU 121 determines a primary object based on a result of the focus detection and information about the luminance of the object. Moreover, the CPU 121 causes the photographic optical system to focus on the area.

After determining the AF mode in step S106 or S107, the processing advances to step S108. In step S108, the CPU 121 repeats procedures from image sensor driving to determination of a focus detection area.

In step S109, the CPU 121 determines whether the user has pressed a shooting preparation switch. If it is determined that the user has not pressed the shooting preparation switch (NO in step S109), then the processing returns to step S102. In step S102, the CPU 121 repeats the processing from steps S102 (driving of the image sensor 107) through S108 (determination of the focus detection area).

On the other hand, if it is determined that the user has pressed the shooting preparation switch (YES in step S109), then the processing advances to step S110. In step S110, the CPU 121 executes a focus detection subroutine.

FIG. 18 is a flow chart illustrating exemplary focus detection subroutine. If the processing has advanced from step S109 to step S110 in the main flow illustrated in FIG. 17, then the subroutine illustrated in FIG. 18 starts.

Referring to FIG. 18, in step S131, the CPU 121 reads the focus detection pixel included in the focus detection area determined in step S108 of the main routine illustrated in FIG. 17. In step S132, the CPU 121 executes defective pixel presence determination processing for detecting a defective pixel existing within the section described above with reference to FIGS. 11 through 13.

Information about the location of the defective pixel is previously stored on the memory 133. The CPU 121 determines whether any defective pixel exists within the section according to the defective pixel location information. The same applies to second through fourth exemplary embodiments, which will be described in detail below.

In step S133, the CPU 121 determines whether any defective pixel is not included in the focus detection pixel. If it is determined that no defective pixel is included in the focus detection pixel (NO in step S133), then the processing advances to step S134. In step S134, the CPU 121 adds all the focus detection pixels within the section to generate an AF pixel signal.

On the other hand, if it is determined that a defective pixel is included in the focus detection pixel (YES in step S133), then the processing advances to step S135. In step S135, the CPU 121 executes addition of the focus detection pixels other than the defective pixel within the section.

In step S136, the CPU 121, by using a correction coefficient (correction value) K, which corresponds to the number of defective pixels within the section, corrects the result of the addition executed in step S135.

In the present exemplary embodiment, the correction coefficient K can be calculated by the following expression:

$$K=N/(N-M)$$

where "N" denotes the number of focus detection pixels included in the section and "M" denotes the number of the defective pixels existing within the section.

The result of the addition does not include a defective pixel signal. Accordingly, the level of the signal becomes lower than the result of the addition of the section including no defective pixel. The present exemplary embodiment corrects the result of the addition by using the correction coefficient K to reduce the effect from the defective pixel.

As described above, each of the sections described above with reference to FIG. 11 or 13 includes five focus detection pixels used for the pupil division in the horizontal direction and another five focus detection pixels used for the pupil division in the vertical direction. If one of the five focus detection pixels used for the pupil division in the horizontal direction is defective, the CPU 121 executes the addition on the signals of the other four pixels, which are not defective. The CPU 121 multiplies the result of the addition with the correction coefficient K (=5/(5−1)=1.25) and to correct the image. The CPU 121 executes the processing in steps S133 through S136 on all the sections existing within the focus detection area.

In step S137, the CPU 121 generates signals of two images used for the correlation calculation according to the result of the calculation in steps S134 and S136. More specifically, the CPU 121 generates a pair of image signals, such as the image signals AFSIGh (A1) and AFSIGh (B1) or AFSIGv (C3) and AFSIGv (D3), which are described above with reference to FIG. 16.

In step S138, the CPU 121 executes the correlation calculation on the acquired two images to calculate the relative amount of defocus between the two images. In step S139, the CPU 121 determines the dependability of the correlation calculation result.

In the present exemplary embodiment, the "dependability" refers to the degree of matching between the two images. If the degree of matching between the two images is high, it is generally determined that the dependability of the result of the focus detection is high. If a plurality of focus detection areas has been designated, the CPU 121 preferentially uses the information more highly dependable of the information about the two images. In step S140, the CPU 121 calculates the defocus amount according to the highly dependable focus detection result. Then, the processing returns to step S111 of the main flow illustrated in FIG. 17.

In step S111 (FIG. 17), the CPU 121 determines whether the defocus amount calculated in step S140 (FIG. 18) is equal to or less than a predetermined tolerable value. If it is determined that the defocus amount calculated in step S140 (FIG. 18) is greater than a predetermined tolerable value (NO in step S111), then the CPU 121 determines that the object is not in an in-focus state and advances to step S112. In step S112, the CPU 121 drives a focus lens and repeats the processing in steps S110 through S112.

On the other hand, if it is determined that the in-focus state has been achieved, then the processing advances to step S111. In step S113, the CPU 121 displays information indicating the in-focus state on the display unit 131. Then, the processing advances to step S114.

In step S114, the CPU 121 determines whether the photographer has pressed a shooting start switch. If it is determined that the photographer has not pressed the shooting start switch (NO in step S114), then the CPU 121 repeats the processing in step S114 to wait until the photographer presses the shooting start switch. On the other hand, if it is determined that the photographer has pressed the shooting start switch (YES in step S114), then the processing advances to step S115. In step S115, the CPU 121 executes a shooting subroutine.

FIG. 19 is a flow chart illustrating an exemplary shooting subroutine. When the photographer presses the shooting start switch, the processing advances to step S115 and thus the shooting subroutine illustrated in FIG. 19 starts.

Referring to FIG. 19, in step S161, the CPU 121 drives the shutter actuator 112 to control the opening of the shutter 102, which regulates the exposure time. In step S162, the CPU 121 reads the image to shoot a high pixel value-still image (reads all the pixels).

In step S163, the CPU 121 executes interpolation of defective (lost) pixels of the read image signal. In other words, because the output of a focus detection pixel does not include RGB color information, which is used for imaging, and because the output of the focus detection pixel is substantially equivalent to a defective pixel in forming an image, the CPU 121 generates an image signal according to information about the peripheral imaging pixels by executing the above-described interpolation.

In step S164, the CPU 121 executes various image processing, such as gamma correction and edge enhancement of the image. In step S165, the CPU 121 records the captured image on the memory 133.

In step S166, the CPU 121 displays the captured image on the display unit 131. Then, the processing returns to the main flow illustrated in FIG. 17 and the above-described series of shooting operations end.

As described above, in steps S132 (FIG. 18) through S136 (FIG. 18), the CPU 121 according to the present exemplary embodiment determines whether any defective pixel exists within the section of the focus detection area. If it is determined that a defective pixel exists, then the CPU 121 according to the present exemplary embodiment calculates the result of the addition according to the signal of the pixels that do not include a defective pixel. Then, the CPU 121 corrects the addition result according to the correction coefficient, which is equivalent to the number of the defective pixels.

With the above-described configuration, even if several defective pixels exist, the present exemplary embodiment can execute the above-described focus detection according to the signals of two images appropriate for use in the correlation calculation generated in the above-described manner.

If a defective pixel exists within the section of the focus detection area, the CPU 121 according to the above-described first exemplary embodiment calculates the focus detection pixel signal that does not include a defective pixel and corrects the addition result according to the correction coefficient determined according to the number of the defective pixels.

In a second exemplary embodiment of the present invention, the CPU 121 executes processing on the defective pixel which is different from that in the first exemplary embodiment.

Now, an exemplary operation according to the present exemplary embodiment will be described in detail below with reference to FIG. 20.

Figure 20:
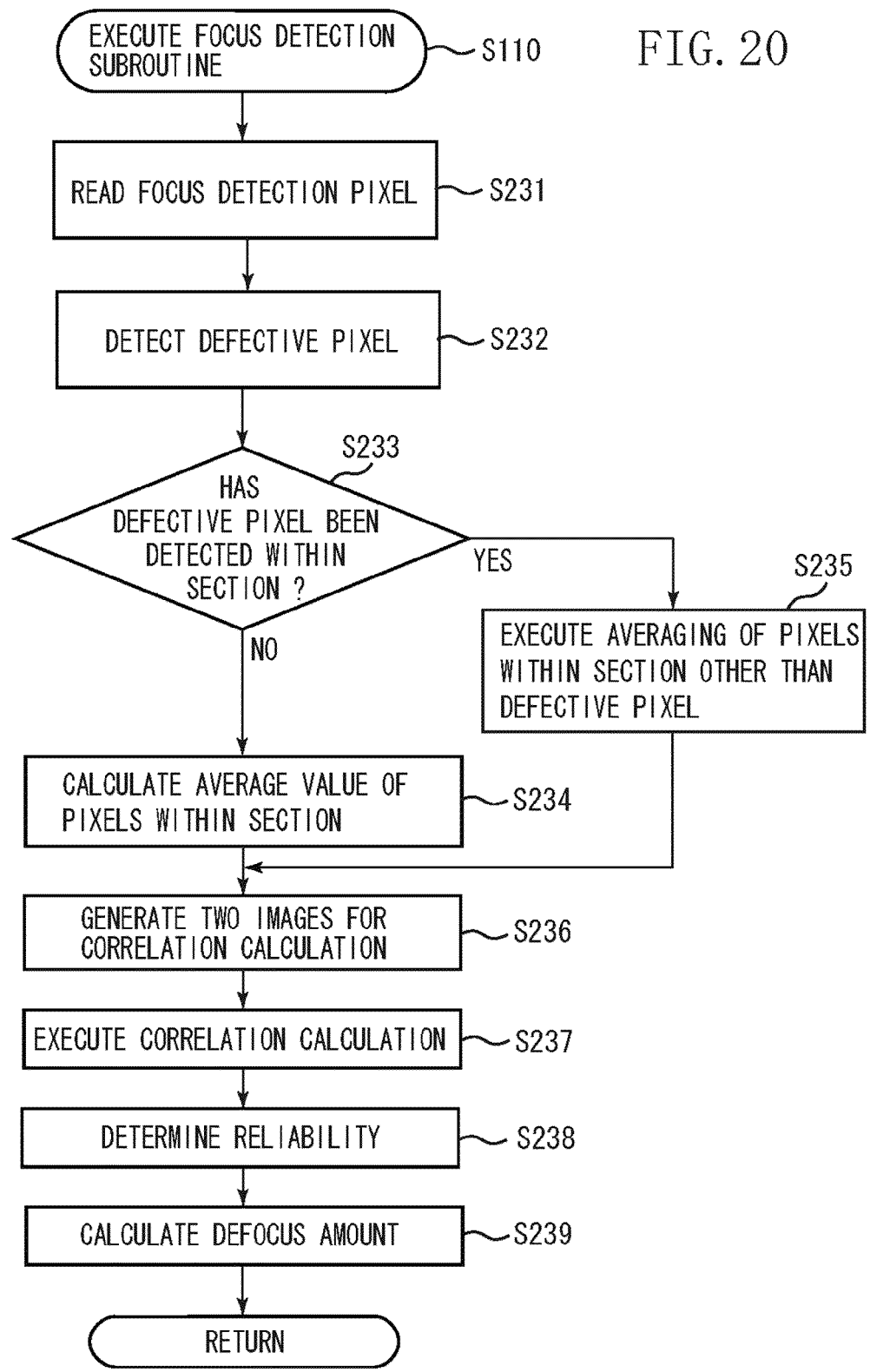
FIG. 20 is a flow chart illustrating an exemplary focus detection subroutine according to a second exemplary embodiment of the present invention.

The flow chart illustrated in FIG. 20 corresponds to the flow chart illustrated in FIG. 18 in the first exemplary embodiment. More specifically, the flow chart illustrated in FIG. 20 corresponds to the focus detection subroutine executed in step S110 of the main sequence illustrated in FIG. 17.

Referring to FIG. 20, in step S231, the CPU 121 reads the focus detection pixel included in the focus detection area determined in step S108.

In step S232, the CPU 121 starts defective pixel presence determination processing. In step S233, the CPU 121 determines whether a defective pixel exists within the section of the focus detection area. If it is determined that no defective pixel is included in the focus detection pixels (NO in step S233), then the processing advances to step S234. In step S234, the CPU 121 averages all the focus detection pixel signals within the section to calculate an average value and generate an AF pixel signal.

On the other hand, if it is determined that a defective pixel is included in the focus detection pixels (YES in step S233), then the processing advances to step S235. In step S235, the CPU 121 executes averaging of the signals of the focus detection pixels other than the defective pixel within the section and acquires an AF pixel signal.

More specifically, if one defective pixel is included in the five focus detection pixels used for the pupil division in the horizontal direction in the section described above with reference to FIG. 13, then the CPU 121 executes the addition of the four pixel signals other than the defective pixel. Moreover, the CPU 121 averages the four pixels.

In step S236, the CPU 121 generates signals of two images used for the correlation calculation according to the AF pixel signal calculated in steps S234 and S235. In step S237, the CPU 121 executes the correlation calculation on the acquired two images to calculate the relative amount of defocus between the two images. In step S238, the CPU 121 determines the dependability of the correlation calculation result.

In the present exemplary embodiment, the "dependability" refers to the degree of matching between the two images. If the degree of matching between the two images is high, it is generally determined that the dependability of the result of the focus detection is high. If a plurality of focus detection areas has been designated, the CPU 121 preferentially uses the information more highly dependable of the information about the two images. In step S239, the CPU 121 calculates the defocus amount according to the highly dependable focus detection result. Then, the processing returns to step S111 of the main flow illustrated in FIG. 17.

As described above, in steps S232 (FIG. 20) through S235 (FIG. 20), the CPU 121 according to the present exemplary embodiment determines whether any defective pixel exists within the section of the focus detection area. Furthermore, if it is determined that a defective pixel exists, then the CPU 121 averages the signals of the pixels that do not include a defective pixel.

With the above-described configuration, even if several defective pixels exist, the CPU 121 according to the present exemplary embodiment can execute the above-described focus detection according to the signals of two images appropriate for use in the correlation calculation generated in the above-described manner.

In a third exemplary embodiment of the present invention, the CPU 121 executes processing on the defective pixel which is different from that in the first and the second exemplary embodiments.

Now, an exemplary operation according to the present exemplary embodiment will be described in detail below with reference to FIG. 21.

Figure 21:
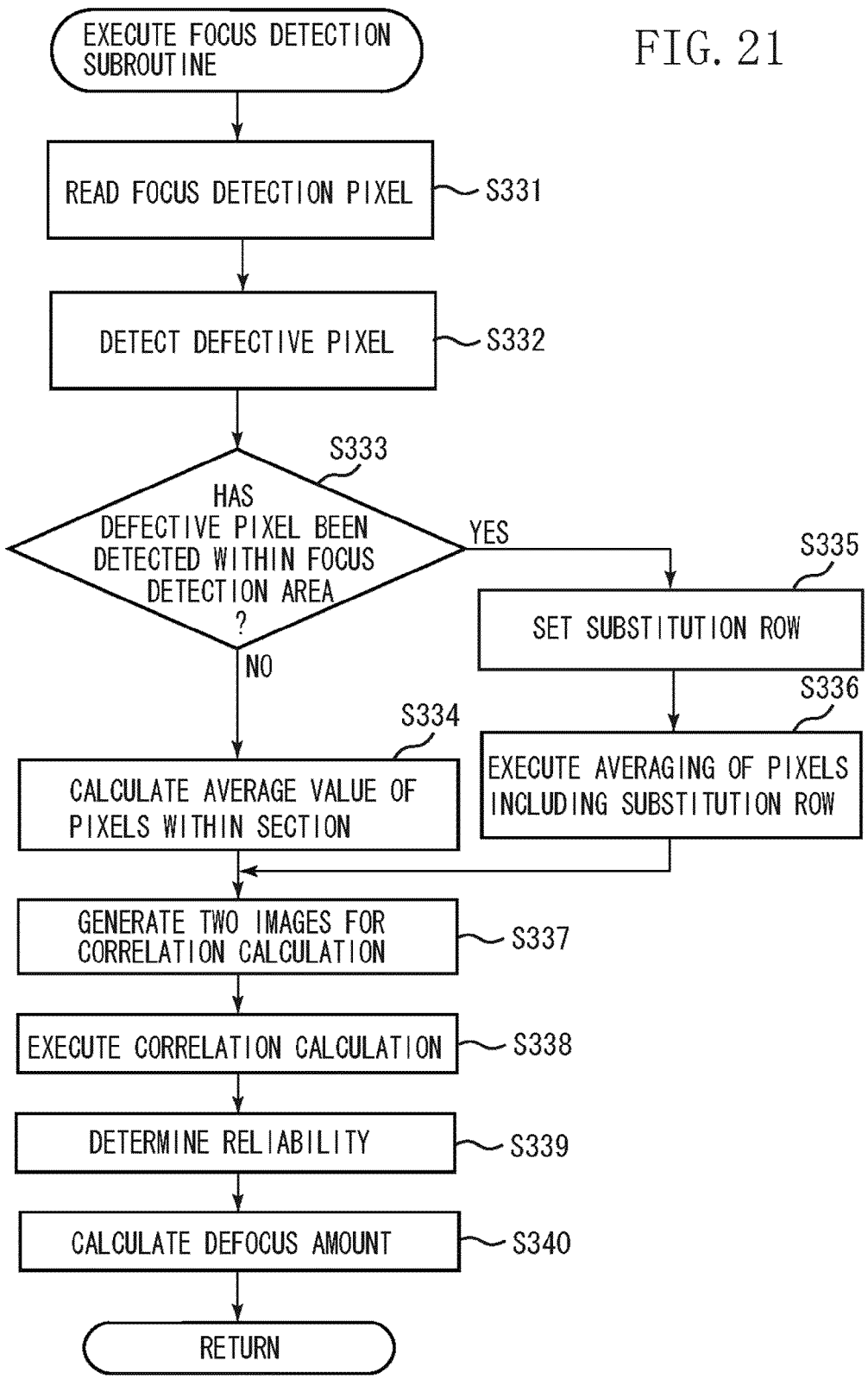
FIG. 21 is a flow chart illustrating an exemplary focus detection subroutine according to a third exemplary embodiment of the present invention.

The flow chart illustrated in FIG. 21 corresponds to the flow chart illustrated in FIG. 18 in the first exemplary embodiment. More specifically, the flow chart illustrated in FIG. 21 corresponds to the focus detection subroutine executed in step S110 of the main sequence illustrated in FIG. 17.

Referring to FIG. 21, in step S331, the CPU 121 reads the focus detection pixel included in the focus detection area determined in step S108.

In step S332, the CPU 121 starts defective pixel presence determination processing. In step S333, the CPU 121 determines whether a defective pixel exists within the section of the focus detection area. If it is determined that no defective pixel is included in the focus detection pixels (NO in step S333), then the processing advances to step S334. In step S334, the CPU 121 adds all the focus detection pixel signals within the section to calculate an AF pixel signal.

On the other hand, if it is determined that a defective pixel is included in the focus detection pixels (YES in step S333), then the processing advances to step S335. In step S335, the CPU 121 sets a substitution row (or a substitution column), which is to be used instead of a defective row (or a defective column) corresponds to a defective pixel. The substitution row will be described in detail below with reference to FIGS. 22, 23, and 12.

Figure 22:
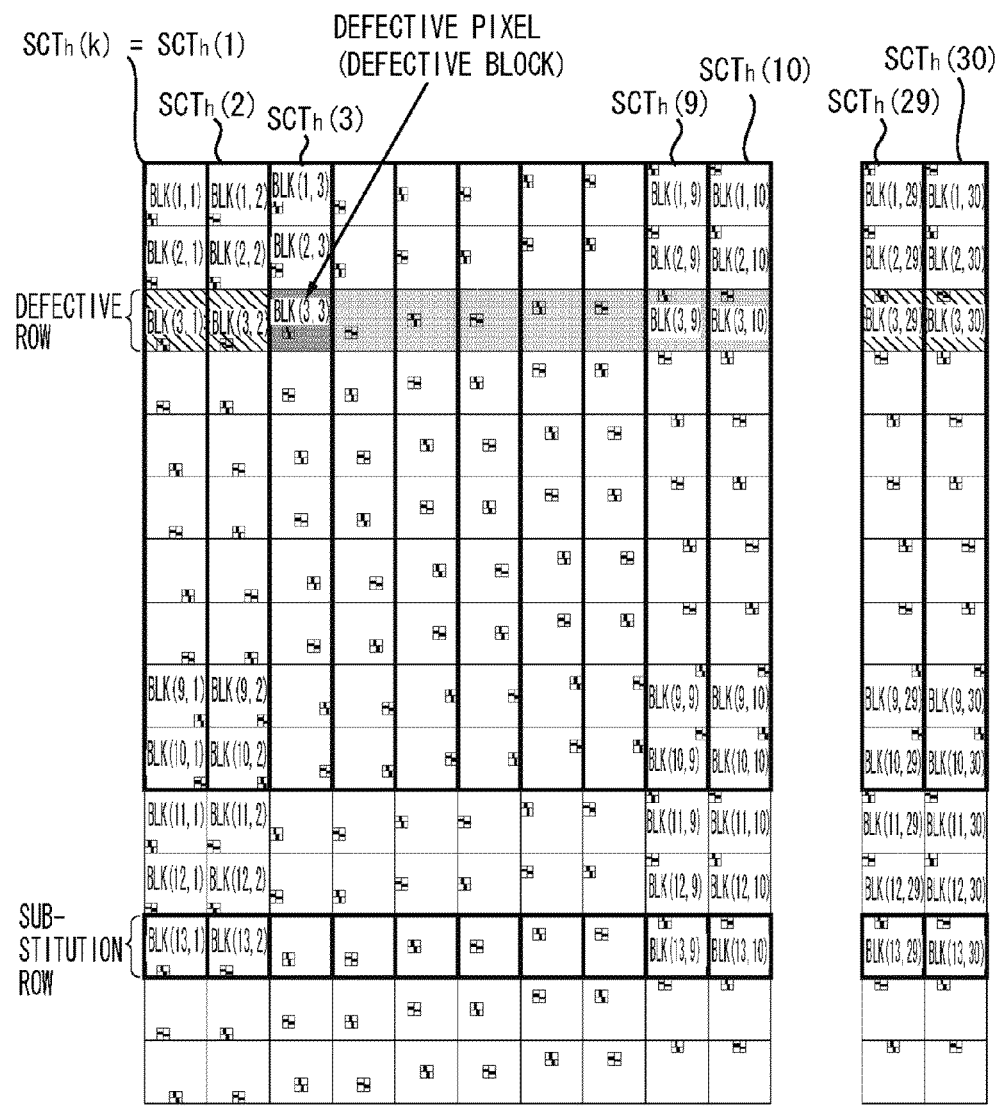
FIG. 22 illustrates exemplary processing executed on a defective pixel according to the third exemplary embodiment of the present invention.

FIG. 22 illustrates an example of the configuration of the section, which is described above with reference to FIG. 11. In the example illustrated in FIG. 22, it is supposed that the focus detection pixel corresponding to the image A of the block BLK (3, 3) is defective.

Figure 23:
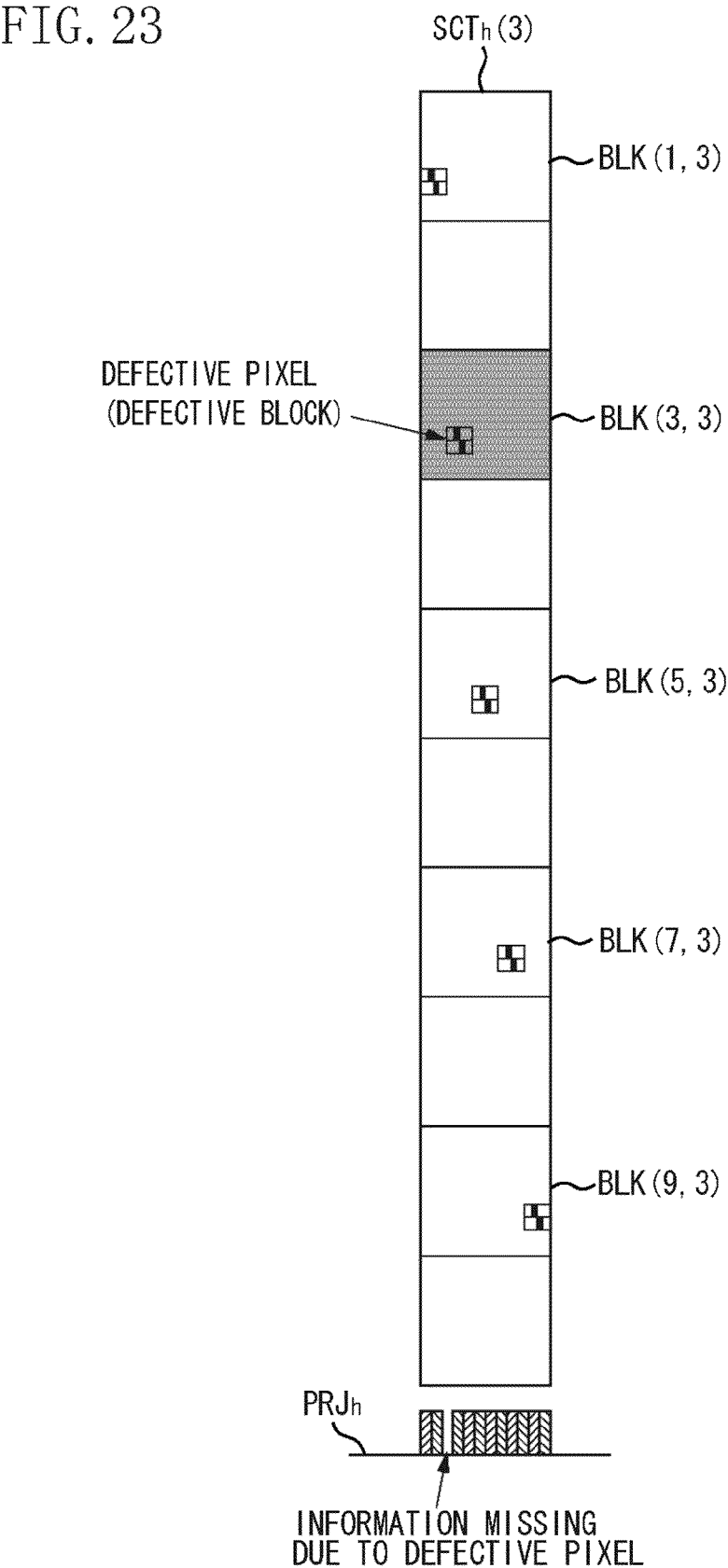
FIG. 23 illustrates an example of an image sampling characteristic acquired if a defective pixel exists according to the third exemplary embodiment of the present invention.

FIG. 23 illustrates the section including the block BLK (3, 3). Referring to FIG. 23, a first projection line is described, which extends in the direction of the horizontal line PRJh illustrated at the bottom portion of the example illustrated in FIG. 23 (in the direction of the pupil division of the focus detection pixels SHA and SHB). If no defective pixel exists, the pixels SHA and SHB are densely and alternately arranged as described above with reference to FIGS. 12A and 12B.

On the other hand, if the defective pixel exists as illustrated in FIG. 23, some of the signals are lost. Accordingly, the capacity of detecting an object having a high space frequency, such as a thin line, may degrade. The present exemplary embodiment adds, to the section, a new block of the same type as the block BLK (3, 3) that corresponds to the detected location.

In the example illustrated in FIG. 22, the CPU 121 excludes blocks BLK (3, 1) through BLK (3, 30) from the calculation within the section. Moreover, the CPU 121 adds a row of the same type as the block (3, 3) that corresponds to the detected location and is located in the vicinity of the focus detection area. Namely, the CPU 121 adds blocks BLK (13, 1) through BLK (13, 30), to an adding operation within the section.

In step S336, the CPU 121 adds the signals of the focus detection pixels on the substitution row (or the substitution column) excluding the defective row (or the defective column) within the section to generate an AF pixel.

In step S337, the CPU 121 generates signals of two images used for the correlation calculation according to the AF pixel signal calculated in steps S334 and S336. In step S338, the CPU 121 executes the correlation calculation on the acquired two images to calculate the relative amount of defocus between the two images. In step S339, the CPU 121 determines the dependability of the correlation calculation result.

In the present exemplary embodiment, the "dependability" refers to the degree of matching between the two images. If the degree of matching between the two images is high, it is generally determined that the dependability of the result of the focus detection is high. If a plurality of focus detection areas has been designated, the CPU 121 preferentially uses the information more highly dependable of the information about the two images.

In step S340, the CPU 121 calculates the defocus amount according to the highly dependable focus detection result. Then, the processing returns to step S111 of the main flow illustrated in FIG. 17.

As described above, in steps S332 (FIG. 21) through S336 (FIG. 21), the third exemplary embodiment determines whether any defective pixel exists within the section of the focus detection area. Furthermore, if it is determined that a defective pixel exists, then the present exemplary embodiment excludes the defective row (column) including the defective pixel from the calculation and substitutes the defective row (column) with the substitution row (column).

As described above, the present exemplary embodiment sets the substitution row (column) at the same defect-detected location as the defective row (column).

With the above-described configuration, even for an object image whose space frequency is high, such as a thin line, the present exemplary embodiment can execute the above-described focus detection according to the signals of two images appropriate for use in the correlation calculation generated in the above-described manner.

In the camera system described above according to the first through the third exemplary embodiments, a part of the imaging area of the image sensor 107 is used as the focus detection area. In a camera system according to a fourth exemplary embodiment of the present invention, a part of the imaging area of the image sensor 107 is used as a light measurement area.

Now, an exemplary configuration of the present exemplary embodiment will be described in detail below with reference to FIGS. 24A through 25.

FIGS. 24A and 24B are diagrams illustrating an exemplary arrangement and structure of light measurement pixels. More specifically, FIG. 24A is a plan view illustrating an example of a pixel having four (2 (lateral)×2 (longitudinal)) pixels including a light measurement pixel.

In acquiring an image signal of an image to be recorded or viewed, a main component of luminance information of a G pixel is acquired. The image recognition characteristic of a person is sensitive to luminance information. Accordingly, if a G pixel is lost or defective, the person may easily recognize that the quality of the image is low.

Meanwhile, an R pixel or a B pixel is a pixel for receiving chrominance information (color difference information). Because the visual characteristic of a person is not sensitive to chrominance information, even if some of pixels for receiving chrominance information are defective, the person may not easily recognize that the quality of the image is degraded.

Accordingly, the present exemplary embodiment uses a G pixel of a pixel group including 2×2 (four) pixels as an imaging pixel (i.e., the present exemplary embodiment does not substitute a G pixel with a light measurement pixel) while substituting the R and B pixels with light measurement pixels (light measurement pixels SBR and SDK illustrated in FIG. 24A).

FIG. 24B illustrates a section A-A of the pixels illustrated in FIG. 24A. In the example illustrated in FIG. 24B, each of a micro lens ML and a photoelectric conversion unit PD has the same configuration as that of the imaging pixel illustrated in FIG. 5B.

The present exemplary embodiment does not use a signal of a light measurement pixel in generating an image. Accordingly, a transparent (clear) filter CFW (white) is provided instead of a color separation color filter. In addition, because pupils of different dimensions are set for the light measurement pixels, the diameters of the openings of wires CL are different from one another.

More specifically, an opening OPBR of the pixel SBR, which is small, receives a light flux that has passed through a small exit pupil EPBR in the vicinity of the optical axis of the photographic optical system TL. On the other hand, an opening OPDK of the pixel SDK has the same dimension as that of a normal imaging pixel. Accordingly, the present exemplary embodiment can capture a light flux that has passed through the photographic optical system TL as effectively as possible.

Since the pixels SBR and SDK are regularly arranged and each luminance signal acquired in each pixel group is appropriately used as the situation demands, the present exemplary embodiment can execute the light measurement on the object with a broad range of gradation.

The image sensor 107 (FIG. 2) outputs a linear signal that is linear to the amount of incident light. An image sensor like this generally has a luminance separation capacity of about 256 gradation patterns. Therefore, the above-described image sensor can execute light measurement only within the luminance range of plus or minus four stages under a condition of one exposure.

Accordingly, the present exemplary embodiment executes the following light measurement. The present exemplary embodiment uses pixels SBR and SDK, whose dimensions of opening are different from each other. The present exemplary embodiment executes the light measurement on a light portion of the object by using the SBR pixel, whose dimension of opening is smaller. On the other hand, the present exemplary embodiment executes the light measurement on a dark portion by using the SDK pixel, whose dimension of opening is larger. Accordingly, the present exemplary embodiment can measure the luminance of a range wider than the above-described "plus or minus four stages".

In the present exemplary embodiment, the imaging pixels and the light measurement pixels are arranged similar to the imaging pixels and the focus detection pixels described above with reference to FIGS. 8 through 10. More specifically, the light measurement pixels SBR are arranged at the locations corresponding to the locations of the focus detection pixels SHA and SVC while the light measurement pixels SDK are arranged at the locations corresponding to the locations of the imaging pixels SHB and SVD.

The method of arranging the imaging pixels and the light measurement pixels in a block, a cluster, and a field, each of which being the arrangement unit, is the same as that of arranging the imaging pixels and the focus detection pixels described above with reference to FIGS. 8 through 10.

Figure 25:
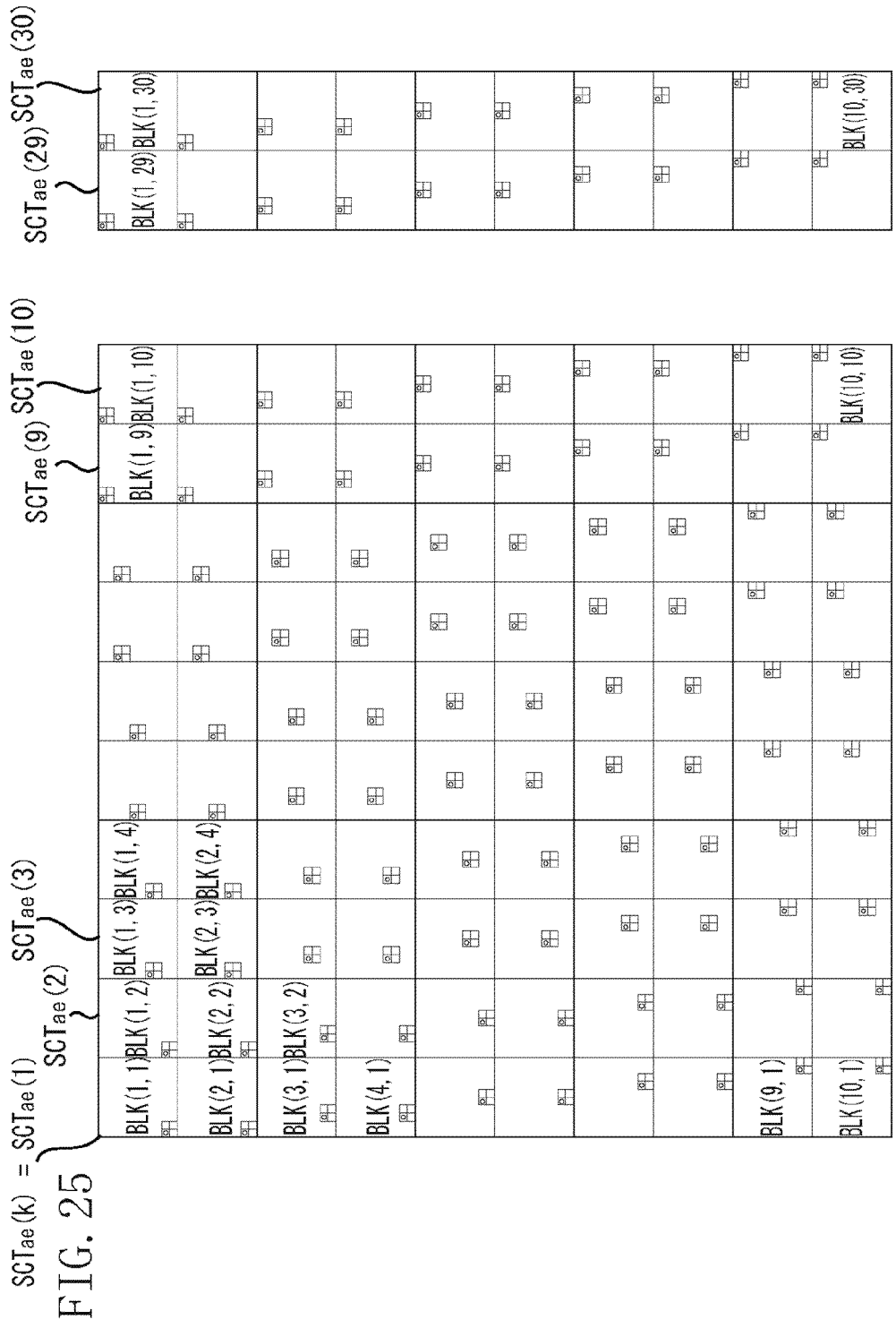
FIG. 25 illustrates an example of a method for grouping the pixels executed during light measurement according to the fourth exemplary embodiment of the present invention.

More specifically, in a pixel array illustrated in FIG. 25, in executing the above-described light measurement, one group includes ten blocks including one block in the lateral direction and ten blocks in the longitudinal direction. In the present exemplary embodiment, the above-described group including ten blocks is defined as a "section".

In addition, in the present exemplary embodiment, one light measurement area includes thirty sections arranged in the lateral direction. More specifically, one light measurement area includes 30,000 (100 (lateral)×300 (longitudinal)) pixels. A light measurement area described above is defined as an "AE area".

One section includes ten pixels SBR, which are used for light measurement of a high-luminance object, and ten pixels SDK, which are used for light measurement of a low-luminance object. In the present exemplary embodiment, the CPU 121 executes addition of the outputs of the ten pixels SBR and sets the result of the addition to obtain one AE pixel as a high-luminance-object light measurement signal.

Similarly, the CPU 121 executes addition of the outputs of the ten pixels SDK and sets the result of the addition to obtain one AE pixel as a low-luminance-object light measurement signal.

Figure 26:
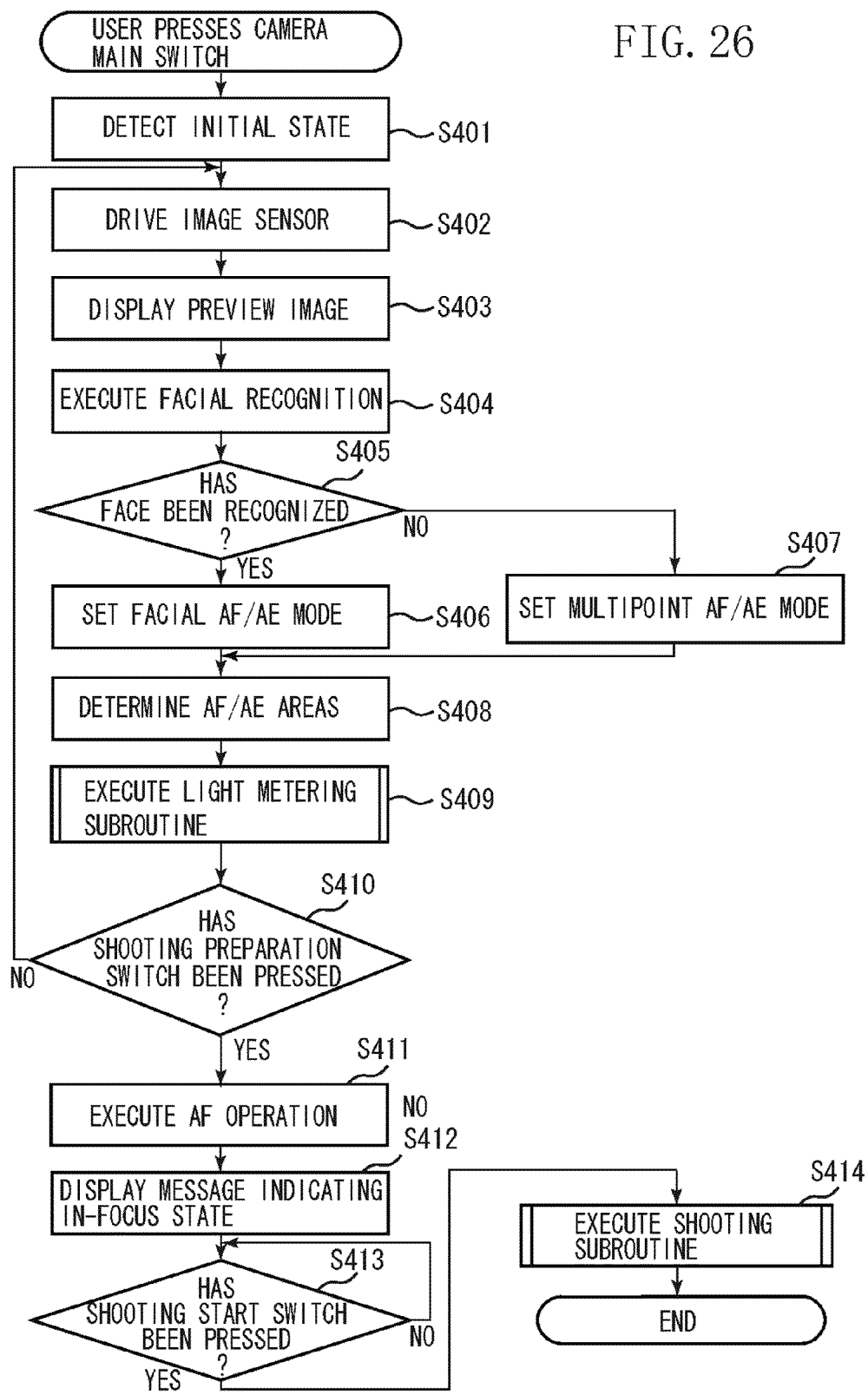
FIG. 26 is a flow chart illustrating an exemplary main control according to the fourth exemplary embodiment of the present invention.
Figure 27:
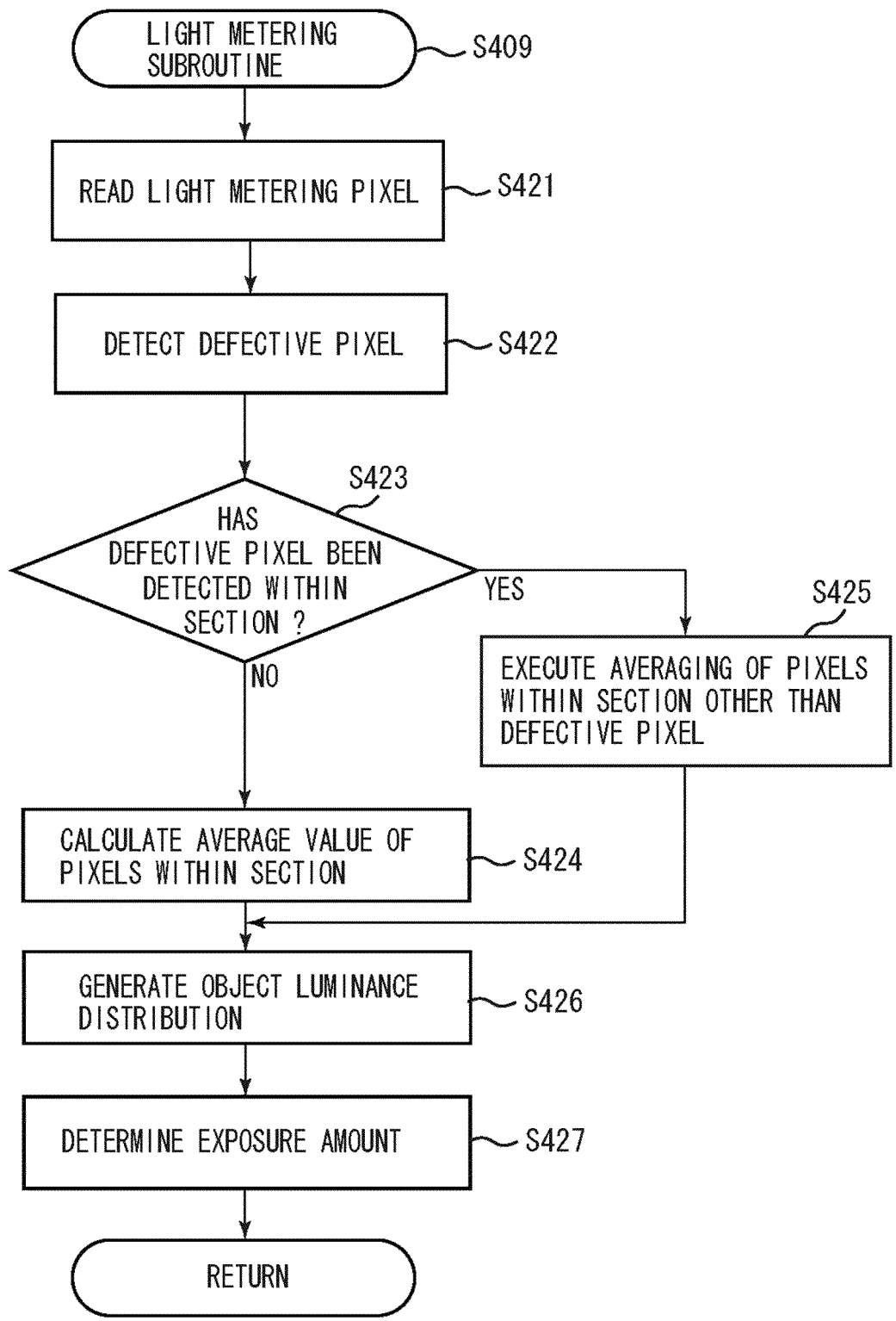
FIG. 27 is a flow chart illustrating an exemplary light measurement subroutine according to the fourth exemplary embodiment of the present invention.
Figure 28:
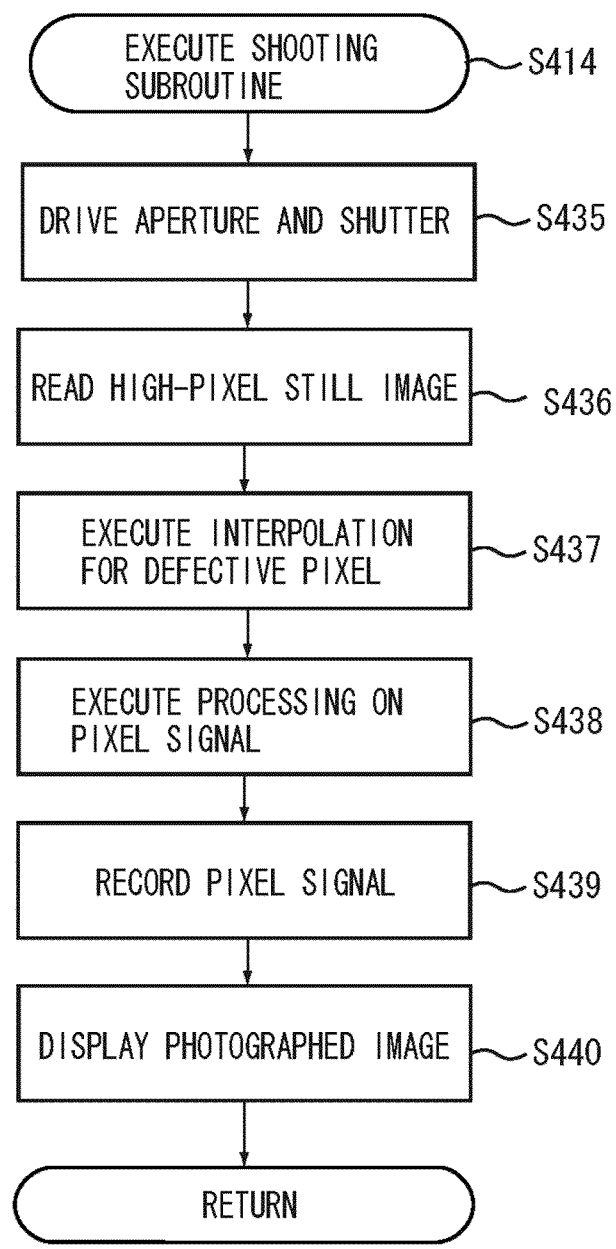
FIG. 28 is a flow chart illustrating an exemplary image taking subroutine according to the fourth exemplary embodiment of the present invention.

FIGS. 26 through 28 are flow charts illustrating exemplary processing executed by the camera according to the present exemplary embodiment for adjusting the exposure and executing shooting.

FIG. 26 is a flow chart illustrating an example of primary processing (main flow) executed by the camera according to the present exemplary embodiment. When the photographer presses the power switch of the camera, the processing illustrated in FIG. 26 starts.

Referring to FIG. 26, in step S401, the CPU 121 verifies the operation of each actuator and the image sensor 107 of the camera. In addition, the CPU 121 initializes the content stored on the memory and a program to be executed. Then, the CPU 121 starts a shooting preparation operation.

In step S402, the CPU 121 starts an imaging operation of the image sensor 107. In addition, the CPU 121 outputs a low pixel value-moving image, which is used as a preview image.

In step S403, the CPU 121 displays the read moving image on the display unit 131. The display unit 131 is provided on the back surface of the camera. The photographer can view the displayed preview image to determine the composition of the image to be shot.

In step S404, the CPU 121 executes face recognition on the preview moving image. In step S405, the CPU 121 determines whether an image of the face of a person exists within the preview moving image.

If it is determined that an image of the face of a person exists within the preview moving image (YES in step S405), then the processing advances to step S406. In step S406, the CPU 121 sets the focusing mode to a face AF/AE mode. In the present exemplary embodiment, a "face AF/AE mode" refers to an operation mode for focusing on and executing light measurement on the face of a person existing within the imaging area.

On the other hand, if it is determined that no image of the face of a person exists within the preview moving image (NO in step S405), then the processing advances to step S407. In step S407, the CPU 121 sets the focusing mode to a multipoint AF/AE mode. A "multipoint AF/AE mode" refers to an operation mode for executing the following operations. In the multipoint AF mode, the CPU 121 divides the imaging area into fifteen areas (e.g., 3×5 areas). Then, the CPU 121 executes the focus detection and the light measurement on each divided area. In addition, the CPU 121 determines a primary object based on a result of the focus detection and information about the luminance of the object. Moreover, the CPU 121 causes the photographic optical system to focus on the area and executes the light measurement.

After determining the AF/AE mode in step S406 or S407, the processing advances to step S408. In step S408, the CPU 121 determines a focus detection and light measurement area (an AF/AE area).

In step S409, the CPU 121 executes a light measurement subroutine on the AE area determined in step S408.

FIG. 27 is a flow chart illustrating an example of the light measurement subroutine. Processing in step S409 illustrated in FIG. 27 is executed after step S408 illustrated in the main flow (FIG. 26).

Referring to FIG. 27, in step S421, the CPU 121 reads the light measurement pixel included in the light measurement area determined in step S408 of the main routine illustrated in FIG. 26. In step S422, the CPU 121 executes defective pixel presence determination processing for detecting a defective pixel existing within the section according to the configuration of the section described above with reference to FIG. 25.

In step S423, the CPU 121 determines whether any defective pixel is not included in the light measurement pixel. If it is determined that no defective pixel is included in the light measurement pixel (NO in step S423), then the processing advances to step S424. In step S424, the CPU 121 averages the signals of the high-luminance light measurement pixels within the section to generate a high-luminance AE pixel signal.

Furthermore, the CPU 121 executes the above-described calculation for the signals of low-luminance AE pixels within the section to generate a low-luminance AE pixel signal.

On the other hand, if it is determined that a defective pixel is included in the light measurement pixel (YES in step S423), then the processing advances to step S425. In step S425, the CPU 121 averages the signals of the high-luminance AE pixels other than the defective pixel within the section to generate a high-luminance AE pixel signal. Furthermore, the CPU 121 executes the above-described calculation for the signals of low-luminance AE pixels within the section to generate a low-luminance AE pixel signal.

In step S426, the CPU 121 generates an object luminance distribution based on the AE pixel signals generated in step S424 or S425.

An exemplary method for generating the object luminance distribution will be described in detail below with reference to FIGS. 25 through 29.

The opening of the pixel SBR described above with reference to FIG. 25 is smaller than that of the pixel SDK by seven stages. Accordingly, if the light measurement is executed at the same luminance level, the high-luminance AE pixel signal, which has been generated by the calculation on the SBR pixels, has a value lower than the low-luminance AE pixel signal, which has been generated by the calculation on the SDK pixels, by a value equivalent to seven stages.

FIG. 29 illustrates an exemplary correspondence table describing the correspondence between the AE pixel signal and the luminance stage ratio. Referring to FIG. 29, if a value "128" is optimal as the value of the low-luminance AE pixel signal, then the level of overexposure increases as the level of the high-luminance AE signal increases. On the other hand, the level of underexposure increases as the level of the low-luminance AE signal decreases. The present exemplary embodiment generates the object luminance distribution according to the correspondence table described above Referring to FIG. 29.

Returning to FIG. 27, in step S427, the CPU 121 determines an exposure amount to be set for a subsequent shooting operation based on the object luminance distribution generated in the above-described manner in step S426. Then, the processing returns to step S410 of the main flow illustrated in FIG. 26.

In step S410, it is determined whether the photographer has pressed the shooting preparation switch. If it is determined that the photographer has not pressed the shooting preparation switch, the processing returns to step S402 and procedures from image sensor driving to a light metering subroutine in step S409 are repeated.

On the other hand, if it is determined that the photographer has pressed the shooting preparation switch (YES in step S410), then the processing advances to step S411. In step S411, the CPU 121 executes an AF operation.

More specifically, the CPU 121 extracts a high-frequency component of the object image formed on the image sensor 107. In addition, the CPU 121 sets an in-focus position at a position where the acquired high-frequency component becomes highest while driving the third lens unit 105. Thus, the present exemplary embodiment executes the contrast detection type AF operation.

In step S412, the CPU 121 displays information indicating the in-focus state. Then, the processing advances to step S413. In step S413, the CPU 121 determines whether the photographer has pressed the shooting start switch. If it is determined that the photographer has not pressed the shooting start switch (NO in step S413), then the CPU 121 repeats the processing in step S413 to wait until the photographer presses the shooting start switch.

On the other hand, if it is determined that the photographer has pressed the shooting start switch (YES in step S413), then the processing advances to step S414. In step S414, the CPU 121 executes a shooting subroutine.

FIG. 28 is a flow chart illustrating an exemplary shooting subroutine. When the photographer presses the shooting start switch, the processing advances to step S435 and thus the shooting subroutine illustrated in FIG. 28 starts.

Referring to FIG. 28, in step S435, the CPU 121 drives the shutter 102 according to the exposure amount determined in step S427 in the light measurement subroutine (FIG. 27). In addition, the CPU 121 controls the opening, which regulates the exposure time. In step S436, the CPU 121 reads the image to shoot a high pixel value-still image (reads all the pixels).

In step S437, the CPU 121 executes interpolation of defective (lost) pixels of the read image signal. In other words, because the output of a light measurement pixel does not include RGB color information, which is used for imaging, and because the output of the light measurement pixel is substantially equivalent to a defective pixel in forming an image, the CPU 121 generates an image signal according to information about the peripheral imaging pixels by executing the above-described interpolation.

In step S438, the CPU 121 executes various image processing, such as gamma correction and edge enhancement of the image. In step S439, the CPU 121 records the captured image on the memory 133.

In step S440, the CPU 121 displays the captured image on the display unit 131. Then, the processing returns to the main flow illustrated in FIG. 26 and the above-described series of shooting operations end.

As described above, in steps S422 (FIG. 27) through S425 (FIG. 27), the present exemplary embodiment determines whether any defective pixel exists within the section of the light measurement area. Furthermore, if it is determined that a defective pixel exists, then the present exemplary embodiment averages the signals of the pixels that do not include a defective pixel.

With the above-described configuration, even if several defective pixels exist, the present exemplary embodiment can execute the above-described light measurement according to the above-described appropriate object luminance distribution generated in the above-described manner.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority of Japanese Patent Application No. 2008-246590, filed Sep. 25, 2008, which is hereby incorporated by reference herein in its entirety.

What is claimed is:

1. An imaging apparatus configured to capture an image of an object comprising:
   an image sensor including a first pixel group used for generating an image signal by photoelectrically converting an object image that has passed through an exit pupil of a photographic optical system and a second pixel group including a plurality of first focus detection pixels and a plurality of second focus detection pixels, and that has a plurality of focus detection pixel pairs each including a first focus detection pixel and a second focus detection pixel, the first focus detection pixel receiving a light beam that passes through a first pupil area of the photographic optical system that forms an object image and the second focus detection pixel receiving a light beam that passes through a second pupil area of the photographic optical system that forms an object image;
   a memory unit configured to store information about a position of a defective pixel in the second pixel group;
   an eliminating unit that eliminates a value of the defective pixel indicated by the information and a value of one of the first focus detection pixel and the second focus detection pixel that forms the focus detection pixel pair with the defective pixel, the first focus detection pixel or the second focus detection pixel that is a pair of the defective pixel is not a defective pixel, so as not to use the eliminated values for detecting the focusing status;
   a focus adjusting unit that adjusts a focal state of the photographic optical system based on an amount of defocus determined by an amount of relative displacement between a first signal and a second signal obtained as a result of the elimination by the eliminating unit; and
   a controller configured to control a shooting operation executed by the imaging apparatus.

2. The imaging apparatus according to claim 1, wherein the focus adjusting unit is configured to calculate an addition value of the output signals of a plurality of pixels included in the second pixel group other than the defective pixels, and calculate a value by multiplying the addition value by a correction value equivalent to a number of the defective pixels.

3. The imaging apparatus according to claim 1, wherein the focus adjusting unit is configured to calculate an average value of the output signals of the plurality of pixels other than the defective pixels.

4. The imaging apparatus according to claim 1, wherein the focus adjusting unit is configured to add the output signals of the plurality of pixels included in the second pixel group other than the defective pixels to the output signals of pixels existing around the defective pixel.

5. A method for controlling a focus detection apparatus that includes:
   an image sensor including a first pixel group used for generating an image signal by photoelectrically converting an object image that has passed through an exit pupil of a photographic optical system and a second pixel group including a plurality of first focus detection pixels and a plurality of second focus detection pixels, and that has a plurality of focus detection pixel pairs each including a first focus detection pixel and a second focus detection pixel, the first focus detection pixel receiving a light beam that passes through a first pupil area of the photographic optical system that forms an object image and the second focus detection pixel receiving a light beam that passes through a second pupil area of the photographic optical system that forms an object image; and a memory unit configured to store information about a position of a defective pixel in the second pixel group, comprising:
   an eliminating step of performing elimination of a value of the defective pixel indicated by the information and a value of one of the first focus detection pixel and the second focus detection pixel that forms the focus detection pixel pair with the defective pixel, the first focus detection pixel or the second focus detection pixel that is a pair of the defective pixel is not a defective pixel, so as not to use the eliminated values for detecting the focusing status;
   an adjusting step of performing adjustment of a focal state of the photographic optical system based on an amount of defocus determined by an amount of relative displacement between a first signal and a second signal obtained as a result of the elimination.

6. An imaging apparatus comprising:
   an image sensor including a plurality of first pixels and a plurality of second pixels;
   a focus state detector that detects focus deviation amount according to a pair image based on the pixel signals from the first pixels and the second pixels, and
   a memory unit configured to store information about a position of a defective pixel in the first pixels and the second pixels,
   wherein the focus state detector detects, in a case where there is a defective line or row in which the defective pixel exists in one of the first pixels or second pixels which is a pair that form the pair image, the focus deviation amount based on the phase difference of the image, according to the result of correlation calculation of an image based on output signal of the first pixels and the second pixels which eliminated both defective row or line and row or line that is a pair of the defective line or row, the focus state detector eliminates row or line that is a pair of the defective line or row, even in a case where defective pixels do not exist in row or line that is a pair of the defective line or row.

7. A method for controlling a focus detection apparatus that includes:
   an image sensor including a plurality of first pixels and a plurality of second pixels and a memory unit configured to store information about a position of a defective pixel in the first pixels and the second pixels, comprising:
   a focus state detect step that detects focus deviation amount according to a pair image based on the pixel signals from the plurality of the first pixels and the second pixels,
   wherein the focus state detect step detects, in a case where there is a defective line or row in which the defective pixel exists in one of the first pixels or the second pixels, the focus deviation amount based on the phase difference of the image, according to the result of correlation calculation of an image based on output signal of the first pixels and the second pixels which eliminated both defective row or line and row or line that is a pair of the defective line or row, the focus state step eliminates row or line that is a pair of the defective line or row, even in a case where defective pixels do not exist in row or line that is a pair of the defective line or row.

8. The imaging apparatus according to claim 6, wherein the first pixels and the second pixels are focus detection pixel.

9. The imaging apparatus according to claim 8, wherein in the image sensor, pixel for imaging is arranged in two-dimensional state and the focus detection pixel is comprised in a part of each array.

* * * * *